(12) United States Patent
Halama et al.

(10) Patent No.: US 10,671,794 B1
(45) Date of Patent: Jun. 2, 2020

(54) METHOD FOR MEASURING THE DENSITY OF A SEMICONDUCTOR DEVICE LAYOUT

(71) Applicant: INTEL CORPORATION, Santa Clara, CA (US)

(72) Inventors: Stefan Halama, San Jose, CA (US); Saravanan Padmanaban, Hillsboro, OR (US); Phanindra Bhagavatula, Mountainview, CA (US)

(73) Assignee: INTEL CORPORATION, Santa Clara, CA (US)

( * ) Notice: Subject to any disclaimer, the term of this patent is extended or adjusted under 35 U.S.C. 154(b) by 2 days.

(21) Appl. No.: 16/170,187

(22) Filed: Oct. 25, 2018

Related U.S. Application Data

(60) Provisional application No. 62/581,340, filed on Nov. 3, 2017.

(51) Int. Cl.
*G06F 30/398* (2020.01)

(52) U.S. Cl.
CPC .................. *G06F 30/398* (2020.01)

(58) Field of Classification Search
CPC ............... G06F 30/398; G06F 17/5065; G06F 17/5045; G06F 17/5072
USPC .......................... 716/111, 112, 119
See application file for complete search history.

(56) References Cited

U.S. PATENT DOCUMENTS

| | | | | |
|---|---|---|---|---|
| 6,293,674 B1* | 9/2001 | Huang et al. | .......... | A61B 3/102 351/221 |
| 7,124,386 B2* | 10/2006 | Smith et al. | ........ | G06F 17/5068 716/51 |
| 7,865,858 B2* | 1/2011 | Vuong et al. | ....... | G06F 17/5077 716/126 |
| 9,652,574 B2* | 5/2017 | Anikin et al. | ...... | G06F 17/5068 |
| 2005/0044520 A1* | 2/2005 | Vuong et al. | ....... | G06F 17/5077 716/122 |
| 2008/0034332 A1* | 2/2008 | Anikin et al. | ...... | G06F 17/5068 716/54 |
| 2013/0205263 A1* | 8/2013 | Lan | ..................... | G06F 17/5009 716/52 |

* cited by examiner

*Primary Examiner* — Sun J Lin
(74) *Attorney, Agent, or Firm* — Finch & Maloney PLLC

(57) ABSTRACT

A method for determining a density of an integrated circuit layout includes analyzing the IC layout represented by polygons. A portion of the IC layout is analyzed within a sample window located at a sample point. A local density of polygons within the sample window is determined, where an area of one or more of the polygons within the sample window is weighted according to a weighting function giving unequal weight to polygon area based on a position within the sample window. The local density values at each sample point in an array of sample points can be used to determine a layout density and to identify locations of density violations.

20 Claims, 16 Drawing Sheets

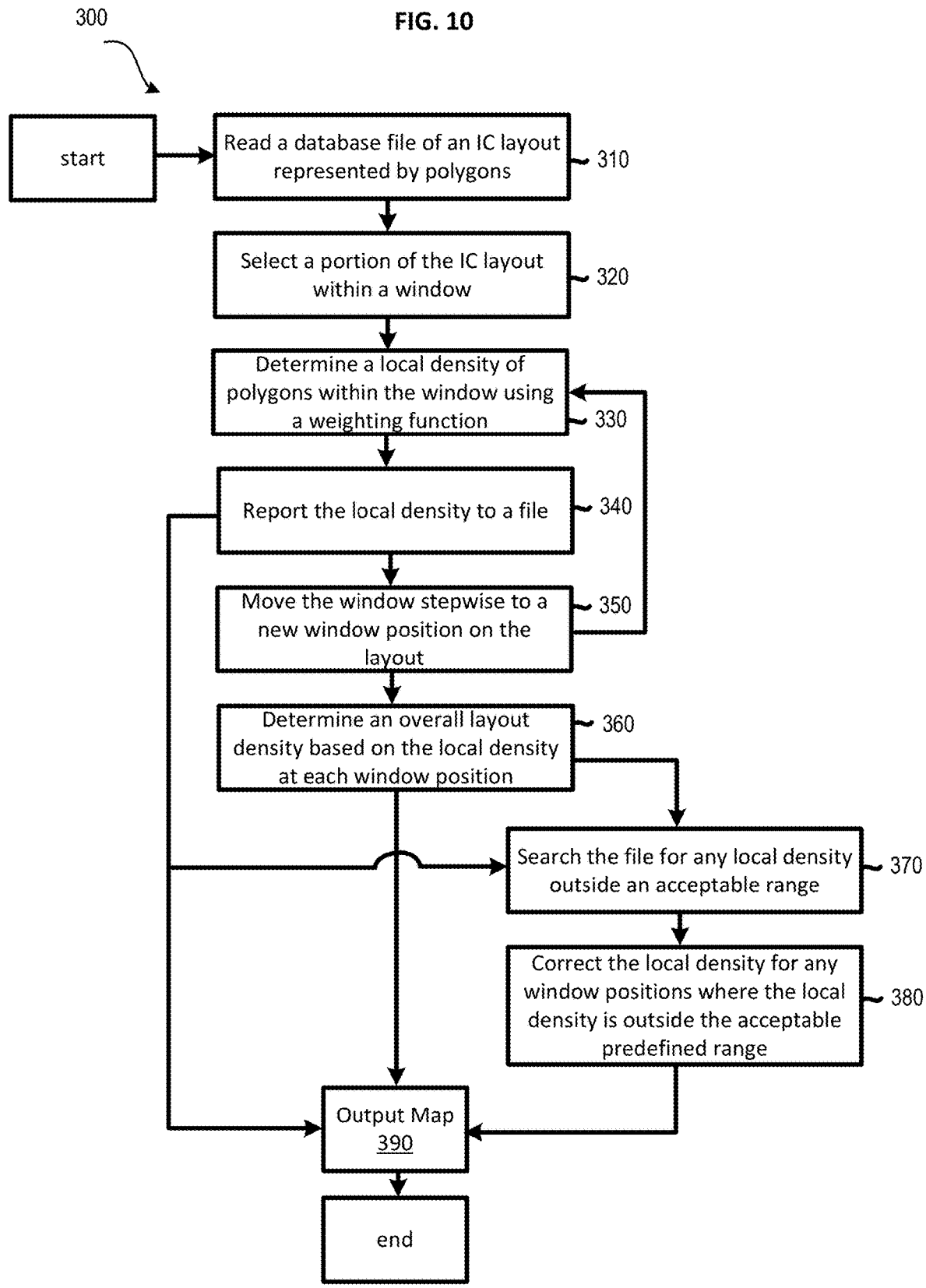

METHOD FOR MEASURING THE DENSITY OF A SEMICONDUCTOR DEVICE LAYOUT

RELATED APPLICATIONS

This application claims priority under 35 U.S.C. § 119(e) to U.S. Provisional Patent Application No. 62/581,340 titled METHOD FOR MEASURING THE DENSITY OF A DEVICE LAYOUT and filed on Nov. 3, 2017, the contents of which are incorporated herein by reference in its entirety.

TECHNICAL FIELD

The present disclosure relates generally to tools and methodologies for making semiconductor device measurements. Specifically, the present disclosure relates to a method of measuring the density of a device layout on a semiconductor wafer or die.

BACKGROUND

To ensure manufacturability and yield, chip manufacturers require product designs to meet certain requirements for layout density. These requirements are expressed as minimum and maximum allowable local density values. Before handing off designs to manufacturing, designers must verify that the device layout meets the local density requirements imposed by manufacturers. For re-usable hard IP blocks or cores in finished layouts for integrated circuits, suppliers must verify that the layout will not cause any violations of the manufacturer's local layout density requirements when such blocks are integrated into product designs by others.

BRIEF DESCRIPTION OF THE DRAWINGS

FIG. 10 illustrates a process flow for a method of determining a density of an integrated circuit, die, or chip, in accordance with an embodiment of the present disclosure.

Figure 1:
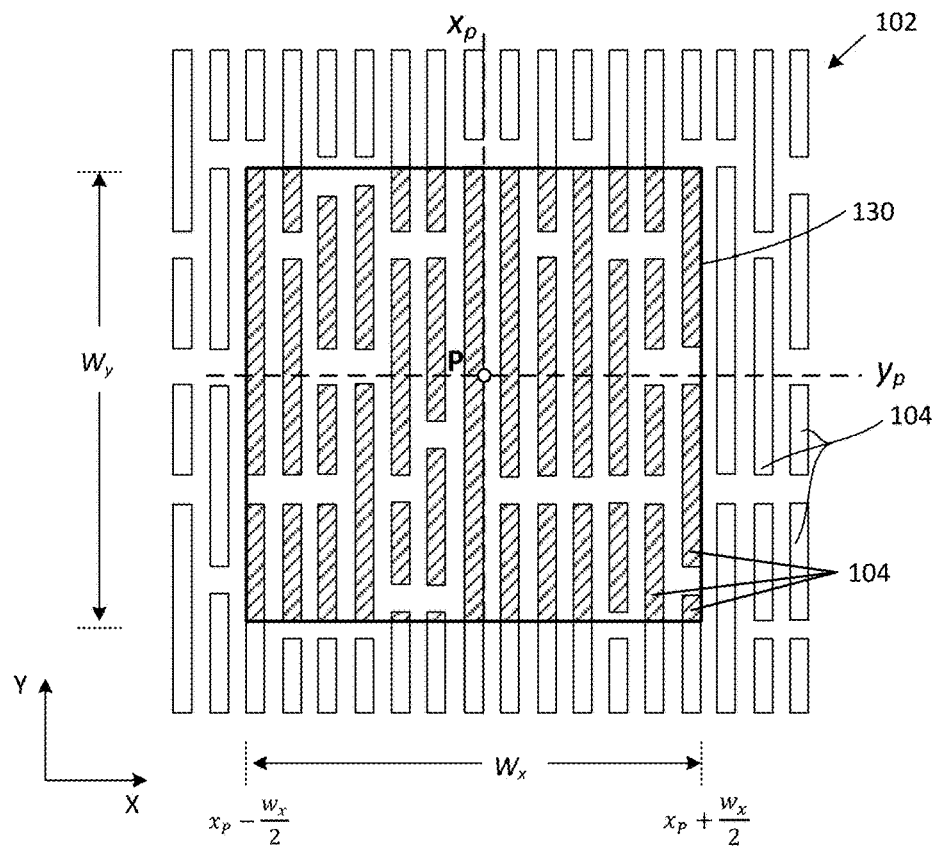
FIG. 1 illustrates an example of a window used to analyze a portion of an integrated circuit layout represented by polygons, where the density of polygons can be determined within the window, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Techniques are disclosed for determining the layout density of a semiconductor wafer, integrated circuit, die, or chip. In one embodiment, a method for determining IC layout density includes analyzing an integrated circuit layout represented by polygons. For example, the integrated circuit layout is a database file with features of the integrated circuit represented by polygons. A portion of the layout is analyzed within a sample window located at a sample point. A local density of polygons within the window is determined, where an area of one or more of the polygons within the window is weighted according to a weighting function giving unequal weight to polygon area based on a position within the window. In some embodiments, polygon areas within the sample window are weighted according to a center-weighted bandwidth-limiting kernel function. The sample window is moved stepwise to sample points distributed across the layout in a grid or array. Values for local density and density gradient can be determined at each sample point. A density function, expressed as a convolution of the kernel function and a polygon area function, can be used to determine a layout density.

In some embodiments, the integrated circuit layout has a rectilinear shape that is subdivided into rectangular subdomains. A circumambient can be constructed around each subdomain and an array of sample points defined on the subdomain. Values of local density and/or density gradient can be determined at each sample point. For example, the sample window is moved stepwise from sample point to sample point using a step size that is smaller than half the window size. The location of density maximum and minimum values can be located within a grid cell by interpolation. Techniques according to the present disclosure can provide increased accuracy and reduced error for determining density of a semiconductor layout.

General Overview

It may be necessary to compute the density of devices and other features in a finished layout of an integrated circuit design. This layout can be referred to as a hard-IP block or a full chip design. Devices, metal contacts, and other features in the layout are represented with polygons, such as an elongated rectangle or rectilinear polygons. Verifying compliance with local density requirements can be performed with computer-aided design (CAD) tools to measure local density by superimposing a sample window of a given size on the layout, computing the total area of the polygons within the boundary of the window, and then dividing by the area of the window. This computation is then repeated many times as the position of the window is moved stepwise from sample point to sample point across the layout until the entire area of the layout has been analyzed.

In essence, the computation is performed at sample points across the layout to calculate a local density at each window position. The local densities can then be used to determine whether the entire layout of the block or the full-chip design meets density requirements. For each window position, the computed local density (e.g., ratio of polygon area within the window to total area of the window) is computed. The step size can be less than the window width so that a portion of the layout in the new window position overlaps a portion of the layout in the previous window position. Each local density value can be compared to an acceptable density range defined between prescribed minimum and maximum density values. Any local density value that is outside the acceptable density range is flagged as a density violation. If no density violations are found in this checking process, the hard-IP blocks are assumed to meet density requirements and are released for full-chip integration. However, there are some non-trivial issues associated with computing layout densities in a finished design. Since some layouts have millions or billions of devices, checking the density everywhere, continuously across the entire layout can be prohibitively time consuming and resource-intensive. For this reason, density measurements may be made only for a representative sample of regions on the layout. In doing so, it is very likely that extreme values (minimum and maximum) of layout density will be missed. It is also possible that violations of allowed density range will not be detected and the density values calculated and reported at sample points will not accurately represent the actual local layout density that determines uniformity of the semiconductor manufacturing process.

One possible approach to the density computation gives equal weight to all polygon areas within the window. By equally weighting all polygon areas in the window, the computation area calculation can undesirably include components with a high spatial frequency as the window steps across the layout. For example, when the sampling frequency is insufficient to meet the Nyquist-Shannon Sampling Theorem, aliasing of the high-frequency geometries can induce an error of about 5%. The result can be false reports of density violations and failures to detect actual density violations. When an acceptable density range is from 35-50%, for example, accounting for this computational error requires designing the layout density to be within a narrower range of 40-45% to ensure that the actual density is not outside the acceptable range when the computational error is considered. Otherwise, seemingly acceptable layouts can be determined later to be unacceptable, which can result in significant production delays and increased costs. Accordingly, a need exists for an improved method of determining layout density for integrated circuits.

Thus, an in accordance with various embodiments of the present disclosure, a method for determining layout density is provided herein. The methodology may provide, for example, reduced error and improved accuracy over existing methods. In one embodiment, the polygonal area within the window is convolved with a center-weighted bandwidth-limiting kernel function. For example, the kernel is a low-pass filter that mostly excludes harmonics of polygonal features smaller than the size of the window. In some embodiments, a raised cosine kernel can be used to provide non-uniform weighting of polygonal areas within the window. For example, the raised cosine kernel increases the weight to 200% for polygonal areas at the center of the window and reduces the weight of polygonal areas moving radially outward from the window center, where polygonal areas at the window boundary are given zero weight. In some embodiments, the kernel width (or window size) can be chosen to be in the range of about 1.5 to 2.0 times (e.g., 1.67 times) the size of the window used in existing methods (e.g., 10 μm×10 μm), yet can provide similar or equivalent responsiveness to detecting changes in density as observed in methods using the smaller window size.

In some embodiments, the increased kernel size compared to existing methods enables polygon areas outside the conventional sample window size to be included in the density computation to some extent. Such an approach contrasts existing methods where no areas outside the window boundary are included in the density computation. Additionally, applying a Stokes theorem to replace integration over the polygonal area with integration over the polygon boundary is a technique that can be used to make computation of the weighted polygon area less burdensome and therefore less expensive. Further, through convolution of polygonal areas with the first derivative of the bandwidth-limiting kernel, the gradient of layout density, can be computed. Density values and gradients computed at sample points can then be used to interpolate local layout density in a cell or region between sample points and thus find the exact location of local minimum and maximum of layout density within a given device design. When features described herein are utilized for computing layout density, the resulting output for layout density has improved accuracy, reduced error, and reliably detects and reports actual density violations, according to some embodiments of the present disclosure. Numerous configurations and variations will be apparent in light of the present disclosure.

Structure and Function

Semiconductor device layouts may include device geometries that repeat hundreds, thousands, or millions of times throughout the area of a die. Layout density computation uses a window or kernel stepped across the entire layout to sample the density of each local area. This sampling approach may not evaluate the true density of the entire layout area, but can be accurate if the sampling frequency is at least twice the highest frequency of layout features (e.g., pitch and/or patterns smaller than the window). When the bandlimit is too high or there is no bandlimit, the reconstruction of sampled data can exhibit harmonics and imperfections known as aliasing. To avoid aliasing, the sample rate must be at least twice the bandlimit of a given function as determined by the Nyquist-Shannon Sampling Theorem, in accordance with some embodiments.

Figure 2:
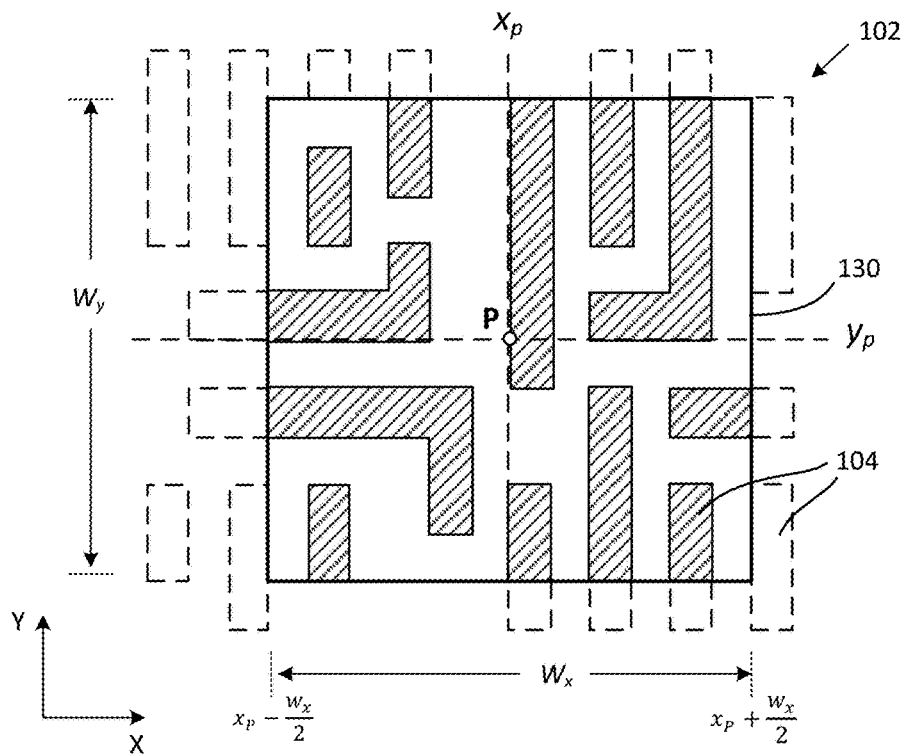
FIG. 2 illustrates a portion of an integrated circuit layout with devices and components represented by polygons, where a density of polygons within the window can be determined, in accordance with an embodiment of the present disclosure.

FIGS. 1 and 2 illustrate examples of a device layout 102 represented by polygons 104. A window 130 superimposed over a portion of the layout 102 can be used to calculate the local density of the layout within a window located at position P with coordinates $x_p$, $y_p$ in an X-Y coordinate system. In some embodiments, the window 130 has a square or rectangular shape with window width $w_x$ and window height $w_y$. The window 130 is centered horizontally and vertically on position P in some embodiments. Devices, contacts, and other structures in the layout 102 are represented by polygons 104, such as elongated, vertically oriented rectangles of various sizes and rectilinear polygons. Window 130 can be used to sample a local density at point P by calculating the area of polygons 104 that are within the bounds of the window 130 based on the general formulas represented in equations 1 and 2 below. In some embodiments, the size of window 130 is chosen with the goal of detecting variations in layout density at a certain characteristic length scale (related to window size), such that violations of minimum or maximum density requirements by features of that certain size or larger are detected reliably, but violations by features much smaller than that size are not detected.

$$\text{Density}(x,y)=\text{Kernel}(x,y)*\text{Layout}(x,y) \quad (1)$$

$$d(x, y) = \quad (2)$$
$$f(x, y) * L(x, y) = \int_{-\frac{w_y}{2}}^{+\frac{w_y}{2}} \int_{-\frac{w_x}{2}}^{+\frac{w_x}{2}} f(-\xi, -\eta) \cdot L(x_P + \xi, y_P + \eta) \cdot d\eta \cdot d\xi$$

Equation 1 is a continuous density function for locations identified by x and y coordinates based on a convolution of a kernel function and a layout function. Equation 2 is a mathematical expression of Equation 1, where Density(x, y) is represented by d (x, y), Kernel(x, y) is represented by $f(x, y)$, and Layout(x, y) is represented by L(x, y). The local density for the window 130 is the convolution of the kernel function and layout function. The layout function L(x, y) is defined to be 1 inside layout polygons 104, and 0 outside layout polygons. The kernel is a weighting function $f(x, y)$ that applies a weight to polygon areas based on their location in the window 130, for example. In some embodiments, the kernel $f(x, y)$ gives equal weight to polygon areas within the window 103 as shown by equation 3.

$$f(x, y) = \begin{cases} 1 \dots \left(-\frac{w_x}{2} < x < +\frac{w_x}{2}\right) \wedge \left(-\frac{w_y}{2} < y < +\frac{w_y}{2}\right) \\ 0 \dots \text{otherwise} \end{cases} \quad (3)$$

Equation 3, above, is an expression for the kernel that can be used to calculate the density of polygonal shapes within a window. The kernel of Equation 3 gives equal weight (e.g., a value of 1) to all polygonal areas within the window 130 and a weight of zero to all other areas outside window 130.

$$d(x, y) = \frac{1}{2 \cdot w_x w_y} \sum_{\substack{k \\ (vertical)}} (x_k + x_{k+1}) \cdot (y_{k+1} - y_k) \quad (4)$$

Equation 4, above, is an expression of layout density d(x, y) using the kernel of Equation 3 to calculate layout density of a window 30 as a function of x and y position, where the window has width $w_x$ and height $w_y$. Equation 5 can be used in determining the layout density using a convolution of local density (e.g., Equation 4) and the kernel (e.g., Equation 3), for example. The calculated layout density can then be compared to a predefined acceptable range for layout density to determine whether the layout density is acceptable. For example, the acceptable range has a layout density minimum Dmin and a layout density maximum Dmax. In some embodiments, for example, the acceptable layout density range is from 35% to 50%. Other ranges of layout density can be used, as will be appreciated.

$$d[i,j]=d(x_p,y_p)=d(o_x+i \cdot s_x, o_y+j \cdot s_x) \quad (5)$$

Equation 5, above, is an expression for a local density value at point P located at ($x_p$, $y_p$), which is i steps of step size $s_x$ along the x-axis and j steps of step size $s_y$ along the y-axis from an origin at ($o_x$, $o_y$).

Figure 3:
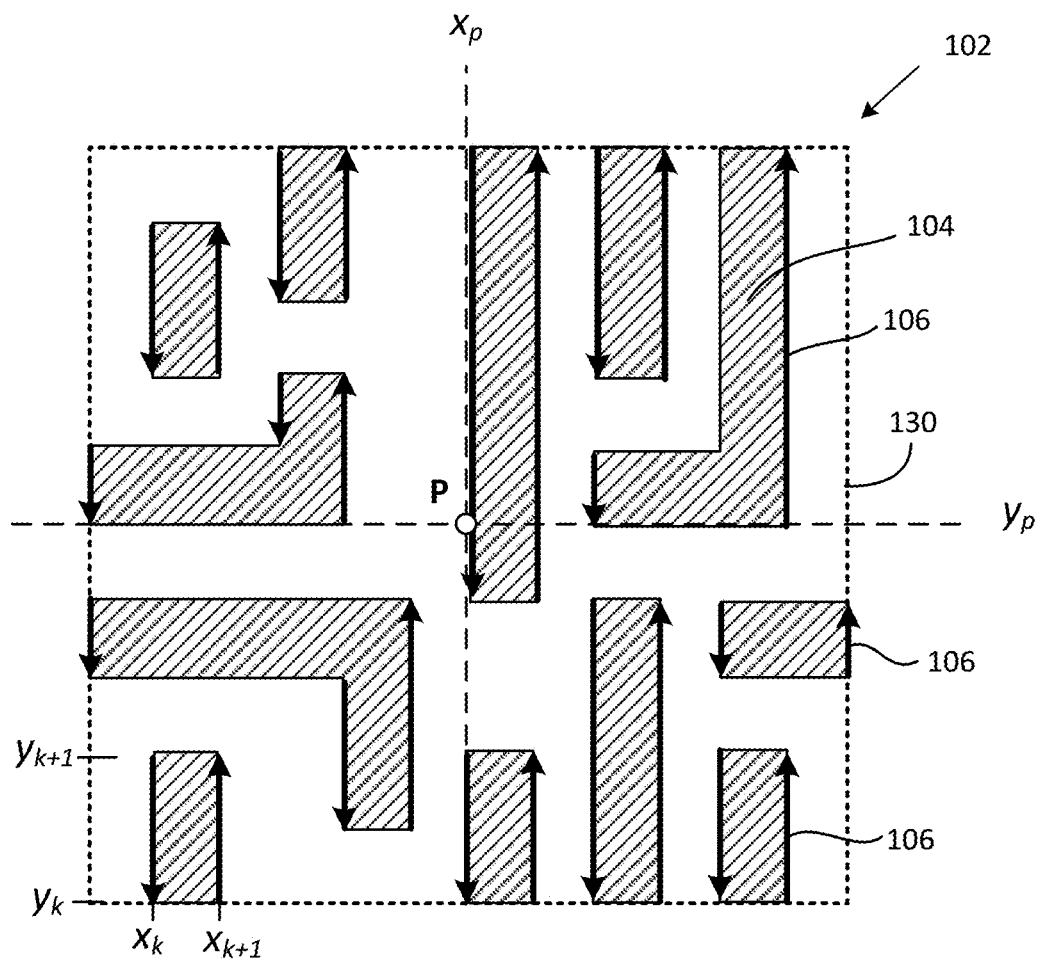
FIG. 3 illustrates the window and polygons of FIG. 2, where vertical edges of each polygon are used in determining the area of the polygons, in accordance with an embodiment of the present disclosure.

Equations 1-5 above can be used to calculate the area of polygons 104 (e.g., filled rectangles) within window 130 at each position of window 30, and to calculate the layout density. FIG. 3 illustrates part of the layout 102 of FIG. 2 and one embodiment of determining the density of polygon area within window 30 using Equation 5. In one such embodiment, the area of polygons 104 inside window 130 is the sum of the products of lengths of the vertical polygon edges 106 (e.g., $y_{k+1}-y_k$) multiplied by the horizontal position corresponding thereto (e.g., $(x_{k+1}+x_k)/2$). The density of polygons inside the window 130 determined using Equation 5 can be weighted according to the selected kernel. Other methods for determining the area of polygons inside the window 130 can be used, as will be appreciated.

In one embodiment in which polygon areas within the window 130 are given equal weight, the local density at each window position can be computed by dividing the sum of polygon areas within the window by the total area of the window 30. In such embodiments, the local density can be expressed as the percentage of the window 30 area occupied by polygons. In other embodiments, polygon areas are weighted according to a center-weighted bandwidth-limiting kernel, such as expressed in Equation 7. Use of the center-weighted bandwidth-limiting kernel is discussed in more detail below.

In one example embodiment, window 130 has a size of 10 μm×10 μm. Window 130 is stepped across layout 102 using step sizes of 5 μm in the x-axis and y-axis directions, $s_x$ and $s_y$, until all areas of layout 102 are sampled. For this example, the window size in both the x and y dimensions is 2 times the step size (i.e., $w_x=2s_x$ and $w_y=2s_y$). In other embodiments, window size $w_x$ and $w_y$ is from 1.5 to 3 times the step sizes $s_x$ and $s_y$, respectively, including 1.7 times, 1.8 times, 1.9 times. 2.1 times, 2.2 times, 2.3 times, 2.4 times, 2.5 times, 2.6 times, 2.7 times, 2.8 times, and 2.9 times. In some embodiments, the ratio of window size to step size in the x-axis direction is different from the ratio of window size to step size in the y-axis direction. Numerous variations and embodiments will be apparent in light of the present disclosure.

Figure 4:
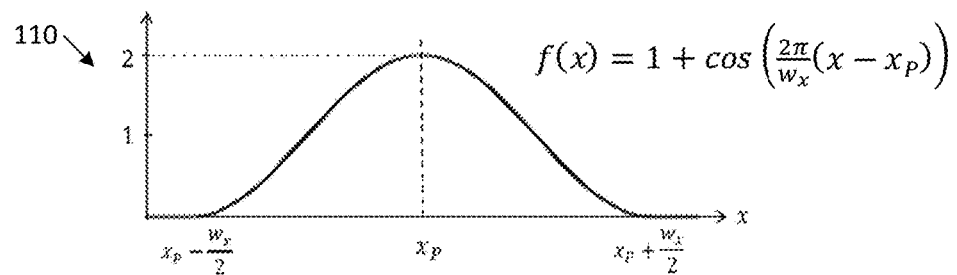
FIG. 4 illustrates a plot of weight versus x-axis position for a center-weighted kernel function used to weigh polygon areas inside a sample window, in accordance with an embodiment of the present disclosure.
Figure 5:
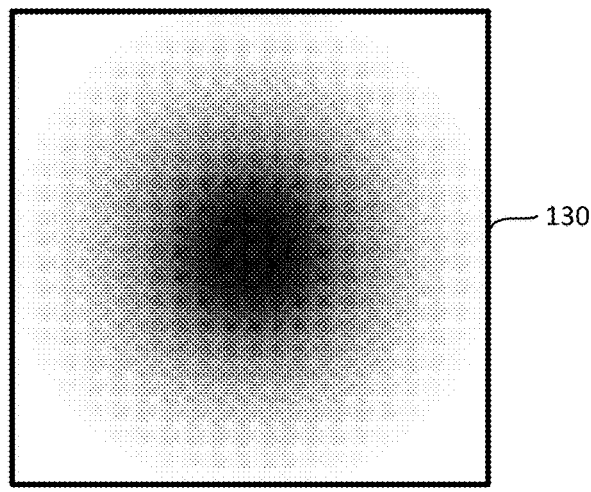
FIG. 5 illustrates a graphical representation of weighting within a sample window, in accordance with an embodiment of the present disclosure.
Figure 6:
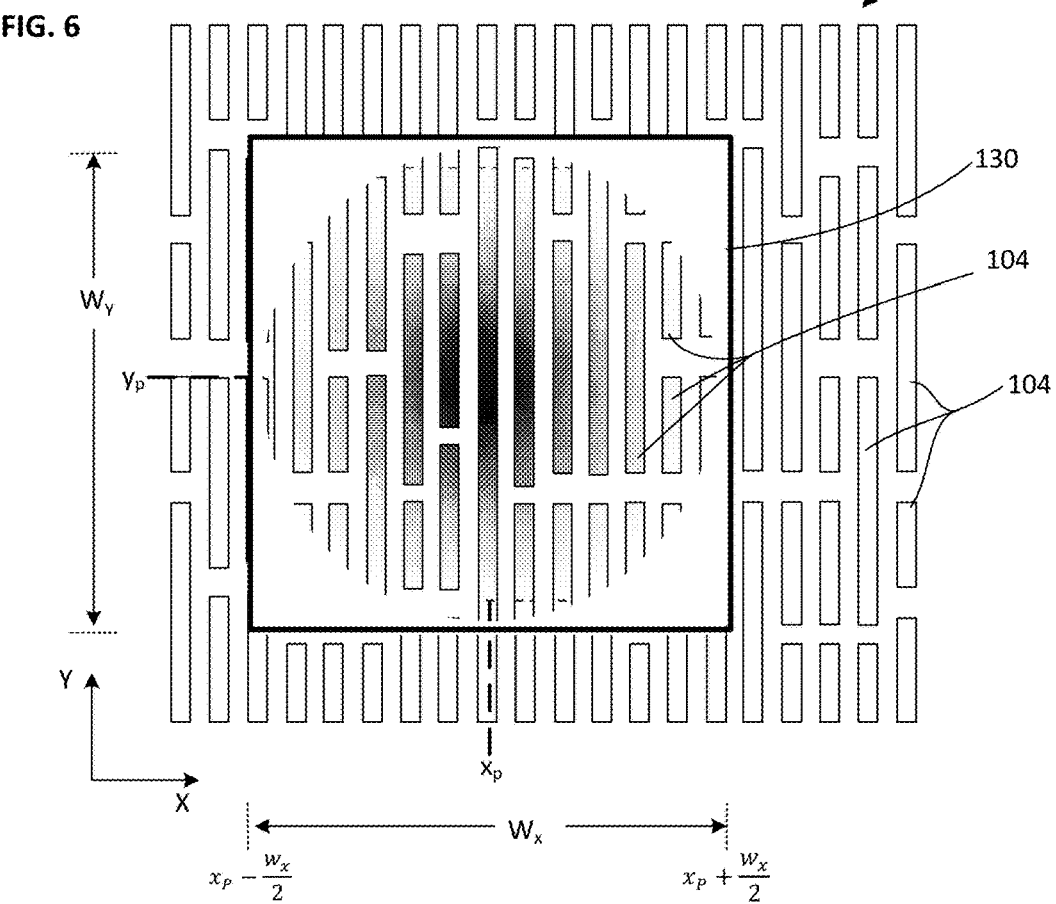
FIG. 6 illustrates a graphical representation of weighting of FIG. 5 applied to polygons within a sample window, in accordance with an embodiment of the present disclosure.

Referring now to FIGS. 4-6, tools are shown for calculating the local density for a given window position according to some embodiments of the present disclosure. FIG. 4 is a plot 110 of polygon area weighting versus x-axis position within window 130 as defined by the kernel of Equation 6, below.

$$f(x) = 1 + \cos\left(\frac{2\pi}{w_x}(x - x_P)\right) \tag{6}$$

The kernel function in Equation 6 is a raised cosine function, also described as a center-weighted bandwidth-limiting kernel. Equation 6 provides the weight applied to polygon areas based on the x position of the integration point compared to window 130 centered on sample point $x_p$ and having window width $w_x$. As shown in plot 110, polygon areas at point P located at the center of the window 130 are given greater weight than polygon areas towards the boundary of the window 130. Using Equation 6, polygon areas at point P have a weight of 2.0 since $x-x_p=0$ and $\cos(0)=1$. In some embodiments, the constant preceding the cosine term in Equation 6 can be greater than or less than one to provide desired results, as will be appreciated.

$$f(x, y) = \begin{cases} \left(1 + \cos\left(\frac{2\pi}{w_x} \cdot x\right)\right) \cdot \left(1 + \cos\left(\frac{2\pi}{w_y} \cdot y\right)\right) & \text{for} \\ \left(-\frac{w_x}{2} < x < +\frac{w_x}{2}\right) \wedge \left(-\frac{w_y}{2} < y < +\frac{w_y}{2}\right) \\ 0 \ldots \text{otherwise} \end{cases} \tag{7}$$

Equation 7, above, is a kernel that provides the weight of polygon areas as a function of x and y position within window 130. Equation 7 is a center-weighted bandwidth-limiting function of x and y. FIG. 5 illustrates a visual representation of weighting for x and y position in window 130 according to the kernel of Equation 7. FIG. 6 illustrates the local convolution product of layout 102 of FIG. 1 with the center-weighted bandwidth-limiting kernel of Equation 7. As can be seen, the weight of polygon areas is the greatest at the center of the window 130 where the color is the darkest. Weight of polygon areas decreases moving radially outward from point P located at $x_p$, $y_p$. Plot 110 of FIG. 4 is aligned vertically with the window 130 of both FIGS. 5 and 6 so that the weighting values of Equation 4 correspond to x-axis positions across window 130. As shown in plot 110, polygon areas at point P located at the center of the window 130 ($x_p$, $y_p$) have a weight of 2.0. Polygon areas outside the window 130 are given zero weight. Convolving the polygon area with the kernel of Equation 7, the layout density d(x, y) can be expressed by Equation 8 as a function of x and y position:

$$d(x, y) = \frac{1}{w_x w_y} \sum_{\substack{k \\ (vertical)}} \left(x_k + \frac{w_x}{2\pi} \cdot \sin\left(\frac{2\pi}{w_x}(x_k - x)\right) \cdot (y_{k+1} - y_k) \cdot \right. \tag{8}$$
$$\left. \left[1 + \frac{w_y}{2\pi(y_{k+1} - y_k)} \cdot \left(\sin\left(\frac{2\pi}{w_y}(y_{k+1} - y)\right) - \sin\left(\frac{2\pi}{w_y}(y_k - y)\right)\right)\right]\right)$$

As shown in FIG. 6, window 130 is superimposed over layout 102 to determine the local density of polygons 104 within window 130. As discussed above, devices, gates, contacts, metal interconnect, and other structures in layout 102 are represented by polygons 104, such as elongated, vertically oriented rectangles of various sizes. In other embodiments, at least some polygons 104 have a rectilinear shape with sides extending along the X and Y axes. Examples of some such shapes include a T shape, an L shape, an I shape, and an H shape. In some embodiments using the raised cosine function kernel of Equations 6 and 7, window 130 has a size (e.g., width) of 1.667 times the size of the window 130 that is used with the equal-weight kernel of Equation 3. For example, the window 130 has a size of 10 μm×10 μm when used with the equal-weight kernel of Equation 3, and has a size of 16.7 μm×16.7 μm when used with the raised cosine kernel of Equations 6 and 7. As discussed in more detail below, the increased size of the window 130 used with the raised cosine kernel has been shown to provide substantially equivalent response to density changes compared to that achieved with the equal-weight kernel of Equation 3.

The kernel of Equation 6 determines the weight of polygonal areas within the window 130 based on the width $w_x$, the x position across layout 102 for a block or full chip, and the x position $x_p$ of the position to be sampled. As shown in FIG. 6, for example, the shading darkness approximates the relative weight of polygonal areas 104 according to the raised cosine kernel. Polygonal areas 104 at the center of window (e.g., at $x_p$) have 200% weighting, consistent with the darkest shading at that location within window 130 of FIG. 5. Polygonal areas 104 at or near the boundary of window 130 (e.g., at $x_p-w_x/2$ and $x_p+w_x/2$), have little or no weighting consistent with the light or no shading. For example, where window width $w_x=10$ and step position $x_p=25$, kernel of Equation 6 at x=30 becomes $f(x)=1+\cos$ $((2\Pi/10)*(30-25))=1+\cos(\Pi)$, which equals 0. Weighting values can be similarly calculated for any position within window 130 using Equation 7.

Figure 7:
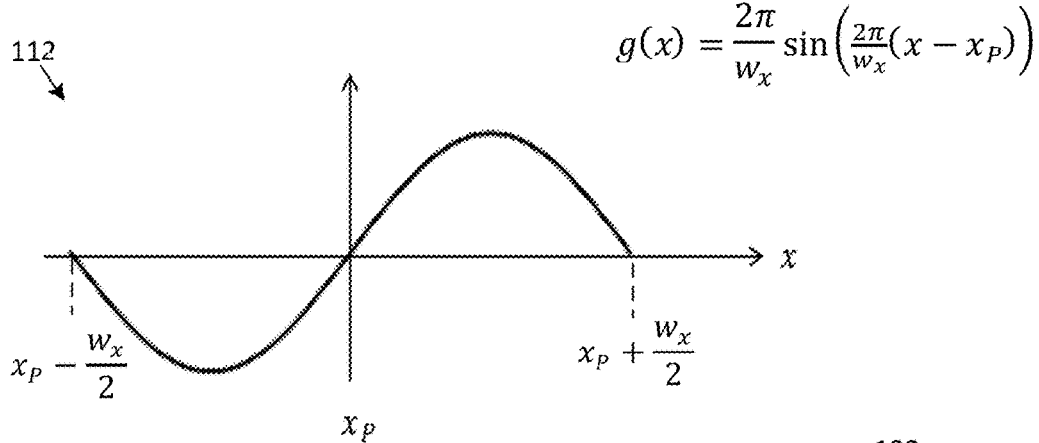
FIG. 7 illustrates a plot of weight versus x-axis position for a kernel function used to determine the gradient of the layout density, in accordance with an embodiment of the present disclosure.
Figure 8:
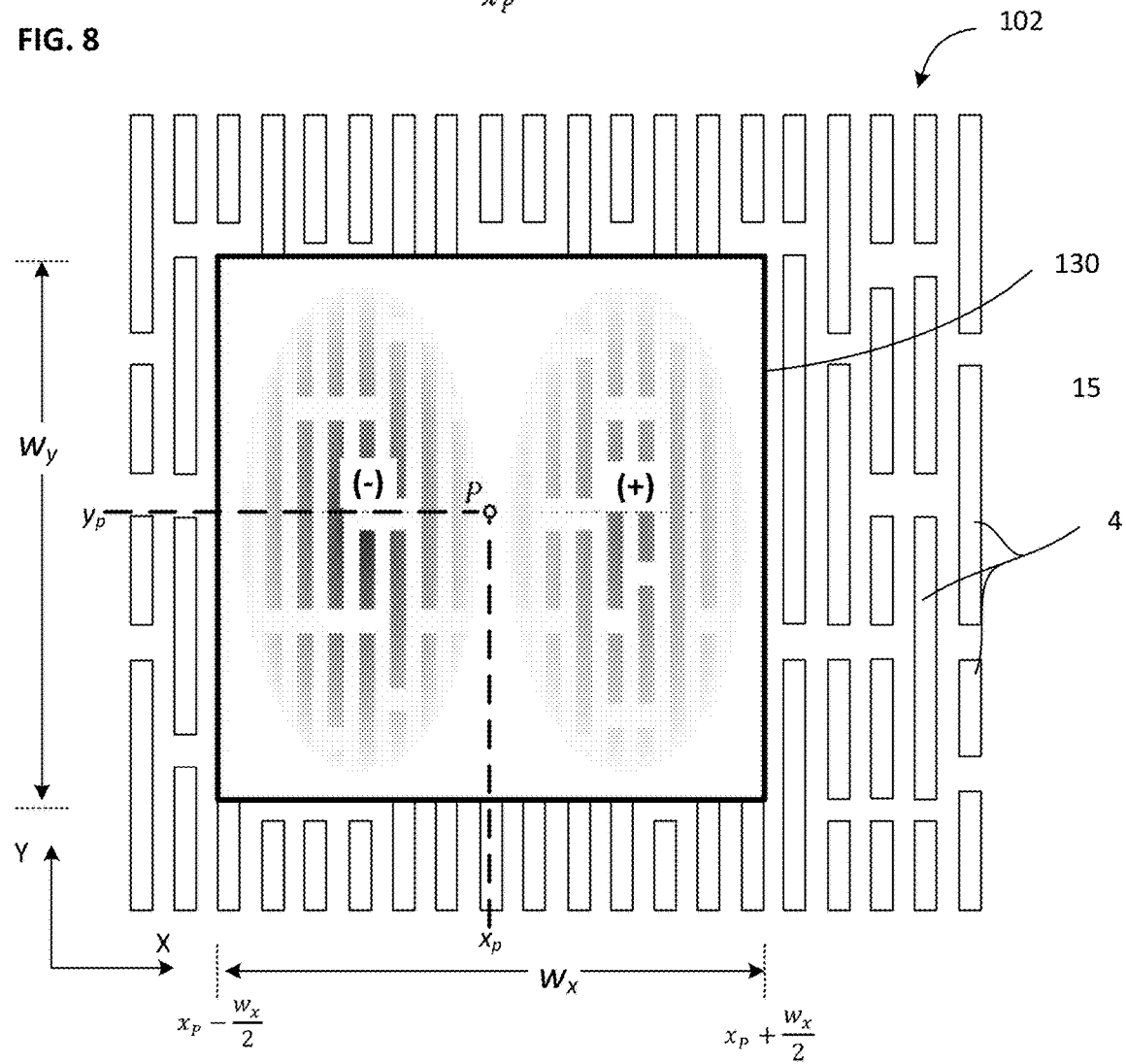
FIG. 8 illustrates a graphical representation of weighting shown in FIG. 7 and applied to polygons within a window in order to measure the gradient of layout density in X direction, in accordance with an embodiment of the present disclosure.

Referring now to FIGS. 7-8, tools are shown for calculating the change in density, or density gradient, for a given window position using convolution with the derivative of center-weighted bandwidth-limiting kernel, in accordance with some embodiments of the present disclosure. FIG. 7 is a plot 112 of weighting gradient versus x-axis position within the window 130. The weighting gradient g(x) can be expressed by equation 9 as a function of x position:

$$g(x) = \frac{2\pi}{w_x} \sin\left(\frac{2\pi}{w_x}(x - x_P)\right) \tag{9}$$

FIG. 8, aligned below plot 112 of FIG. 7, is a visual representation of the partial derivative in x of the center-weighted bandwidth-limiting kernel of Equation 8. FIG. 8 visually shows the gradient of weighting polygon areas within window 130 centered on point P located at $(x_p, y_p)$. Minimum and maximum gradient values of plot 112 (e.g., zero) are represented by dark shading in FIG. 8. The gradient of polygon area weighting in window 130 has a maximum value at $x_p+w_2/4$ and a minimum value at $x_p-w_x/4$. The weight (kernel) function is negative for polygons left of P, positive for polygons right of P.

Equations 10-15 below can be used to calculate the x-gradient $d_x'(x,y)$ and the y-gradient $d_y'(x, y)$ of the local layout density d (x, y). Equation 10 provides the local density gradient, expressed by the first derivative in x of the convolution of the layout function L(x, y) and the center-weighted bandwidth-limiting kernel $f$ (x, y). Equation 11 provides the kernel function g(x, y) used to compute the density gradient via convolution with the layout function L(x, y). Equations 12 and 13 express the local density gradient along the x-axis and y-axis, respectively, for a window 130 located at $x_p, y_p$. Equations 14 and 15 express the local density gradient in the x-axis and y-axis directions for the $i^{th}$ and $j^{th}$ step of size $s_x$ from the origin $o_x, o_y$, respectively.

$$d_x'(x, y) = \frac{\partial}{\partial x}d(x, y) = \frac{\partial}{\partial x}(f * L) = \left(\frac{\partial}{\partial x}f(x, y)\right) * L(x, y) = g(x, y) * L(x, y) \tag{10}$$

$$g(x, y) = \frac{\partial}{\partial x}f(x, y) = -\frac{2\pi}{w_x}\sin\left(\frac{2\pi}{w_x}(x - x_P)\right) \cdot \left(1 + \cos\left(\frac{2\pi}{w_y}(y - y_P)\right)\right) \tag{11}$$

$$d_x'(x, y) = -\frac{1}{w_x w_y} \sum_{k \; (vertical)} \cos\left(\frac{2\pi}{w_x}(x_k - x)\right) \cdot (y_{k+1} - y_k) \cdot \tag{12}$$
$$\left[1 + \frac{w_y}{2\pi(y_{k+1} - y_k)} \cdot \left(\sin\left(\frac{2\pi}{w_y}(y_{k+1} - y)\right) - \sin\left(\frac{2\pi}{w_y}(y_k - y)\right)\right)\right]$$

$$d_y'(x, y) = \frac{1}{w_x w_y} \sum_{k \; (horizontal)} \cos\left(\frac{2\pi}{w_y}(y_k - y)\right) \cdot (x_{k+1} - x_k) \cdot \tag{13}$$
$$\left[1 + \frac{w_x}{2\pi(x_{k+1} - x_k)} \cdot \left(\sin\left(\frac{2\pi}{w_x}(x_{k+1} - x)\right) - \sin\left(\frac{2\pi}{w_x}(x_k - x)\right)\right)\right]$$

$$d_x'[i, j] = d_x'(x_P, y_P) = d_x'(o_x + i \cdot s_x, o_y + j \cdot s_x) \tag{14}$$

$$d_y'[i, j] = d_y'(x_P, y_P) = d_y'(o_x + i \cdot s_x, o_y + j \cdot s_x) \tag{15}$$

Figure 9:
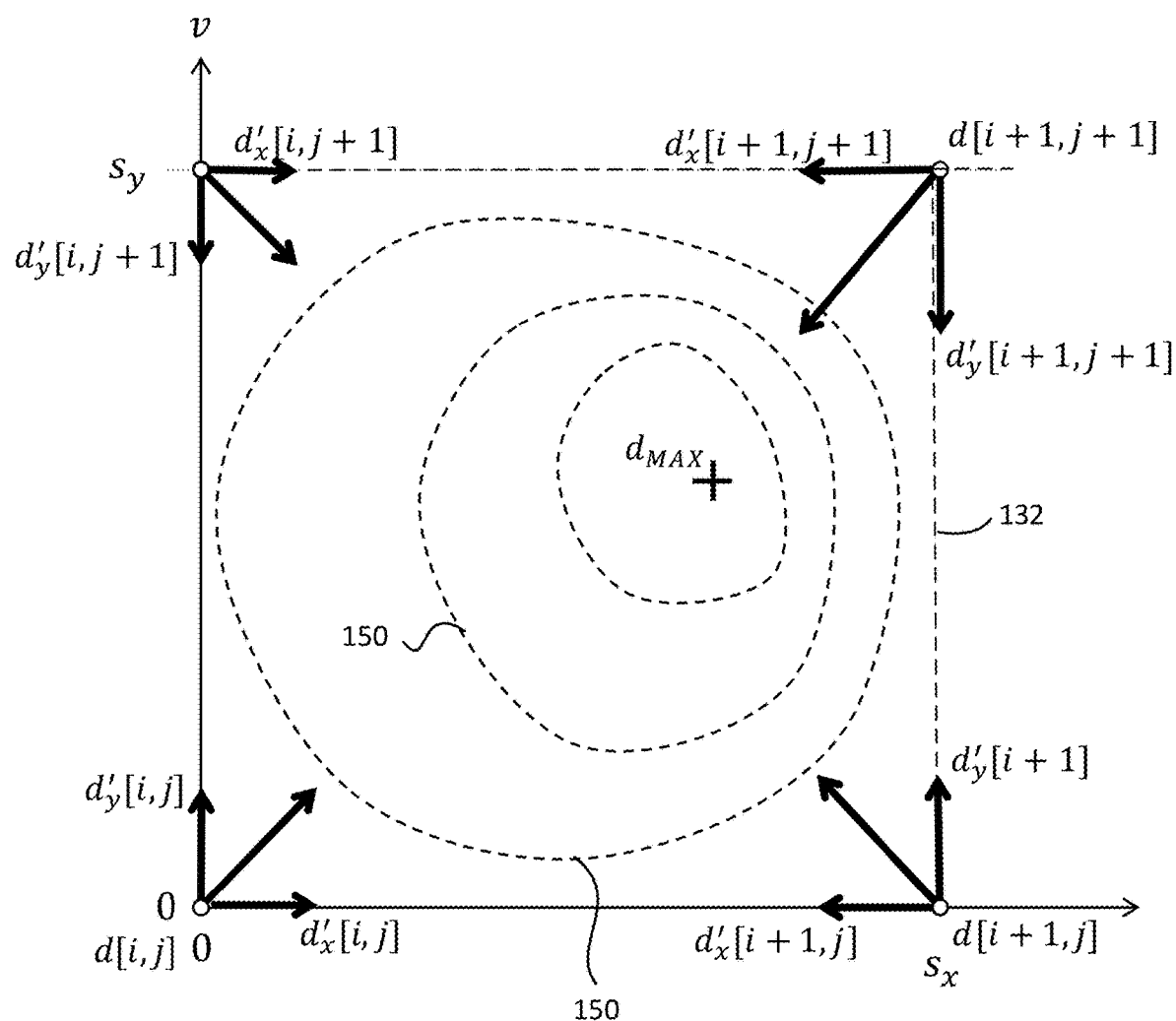
FIG. 9 illustrates a grid cell defined by four points at which density gradients can be calculated and used to find a density maximum or minimum within the cell by interpolation, in accordance with an embodiment of the present disclosure.

Referring to FIG. 9, the gradient of density can be used to find the maximum and minimum values of local density across the layout. This information can be used to determine the exact location of density violations in the layout 102. The four step positions of the window at [i,j], [i+1, j], [i, j+1], [i+1, j+1] form a stepping grid cell 132 as indicated in FIG. 9. At each of the four stepping positions, density values and the gradient of density along the x-axis, and along the y-axis can be calculated according to formulas (4) and (8), (12) and (14), and (13) and (15). If all density gradients at the four corners of this stepping grid cell 132 point inside the cell, then a density maximum $d_{max}$ is located inside the grid cell 132. In some instances, a density maximum is within or along a side of the grid cell 132 if all such gradients are either zero or point to the inside. Similarly, if all such gradients point outside the grid cell 132, then a density minimum $d_{min}$ is located inside the grid cell 132.

FIG. 9 also shows gradient contour lines 150 that represent the topography of the cell 132. Gradient contour lines 150 are similar to elevation lines used in topographical maps. As such, the gradient contour lines 150 may be part of an output of methods disclosed herein, such as part of a density map of the layout 102.

Equation 16, below, is an expression for an interpolated density $\hat{d}(u,v)$ in a stepping grid cell 132 defined by four sample points P. Variables u and v are local coordinates within the grid cell 132. Variable u has a value from zero to $s_x$ and v has a value from zero to $s_y$. Equation 16 interpolates density within the cell 132 as a sum of the three density gradients at each of four corners of the cell 132 (total of twelve gradient expressions) based on density and gradient values determined at the four vertices (i, j), (i+1,j), (i,j+1), and (i+1, j+1) shown in FIG. 9, for example.

$$\hat{d}(u, v) = \frac{1}{4} \left\{ \begin{array}{l} d[i, j] \cdot \left(1 + \cos\left(\frac{u\pi}{s_x}\right)\right) \cdot \left(1 + \cos\left(\frac{v\pi}{s_y}\right)\right) + \\ d[i+1, j] \cdot \left(1 - \cos\left(\frac{u\pi}{s_x}\right)\right) \cdot \left(1 + \cos\left(\frac{v\pi}{s_y}\right)\right) + \\ d[i, j+1] \cdot \left(1 + \cos\left(\frac{u\pi}{s_x}\right)\right) \cdot \left(1 - \cos\left(\frac{v\pi}{s_y}\right)\right) + \\ d[i+1, j+1] \cdot \left(1 - \cos\left(\frac{u\pi}{s_x}\right)\right) \cdot \left(1 - \cos\left(\frac{v\pi}{s_y}\right)\right) + \\ d_x'[i, j] \cdot \left(u - \frac{s_x}{2} + \frac{s_x}{2} \cdot \cos\left(\frac{u\pi}{s_x}\right) + \frac{s_x}{\pi} \cdot \sin\left(\frac{u\pi}{s_x}\right)\right) \cdot \left(1 + \cos\left(\frac{v\pi}{s_y}\right)\right) + \\ d_x'[i+1, j] \cdot \left(u - \frac{s_x}{2} + \frac{s_x}{2} \cdot \cos\left(\frac{u\pi}{s_x}\right) - \frac{s_x}{\pi} \cdot \sin\left(\frac{u\pi}{s_x}\right)\right) \cdot \left(1 + \cos\left(\frac{v\pi}{s_y}\right)\right) + \\ d_x'[i, j+1] \cdot \left(u - \frac{s_x}{2} + \frac{s_x}{2} \cdot \cos\left(\frac{u\pi}{s_x}\right) + \frac{s_x}{\pi} \cdot \sin\left(\frac{u\pi}{s_x}\right)\right) \cdot \left(1 - \cos\left(\frac{v\pi}{s_y}\right)\right) + \\ d_x'[i+1, j+1] \cdot \left(u - \frac{s_x}{2} + \frac{s_x}{2} \cdot \cos\left(\frac{u\pi}{s_x}\right) - \frac{s_x}{\pi} \cdot \sin\left(\frac{u\pi}{s_x}\right)\right) \cdot \left(1 - \cos\left(\frac{v\pi}{s_y}\right)\right) + \\ d_y'[i, j] \cdot \left(v - \frac{s_y}{2} + \frac{s_y}{2} \cdot \cos\left(\frac{v\pi}{s_y}\right) + \frac{s_y}{\pi} \cdot \sin\left(\frac{v\pi}{s_x}\right)\right) \cdot \left(1 + \cos\left(\frac{u\pi}{s_x}\right)\right) + \\ d_y'[i+1, j] \cdot \left(v - \frac{s_y}{2} + \frac{s_y}{2} \cdot \cos\left(\frac{v\pi}{s_y}\right) + \frac{s_y}{\pi} \cdot \sin\left(\frac{v\pi}{s_x}\right)\right) \cdot \left(1 - \cos\left(\frac{u\pi}{s_x}\right)\right) + \\ d_y'[i, j+1] \cdot \left(v - \frac{s_y}{2} + \frac{s_y}{2} \cdot \cos\left(\frac{v\pi}{s_y}\right) - \frac{s_y}{\pi} \cdot \sin\left(\frac{v\pi}{s_x}\right)\right) \cdot \left(1 + \cos\left(\frac{u\pi}{s_x}\right)\right) + \\ d_y'[i+1, j+1] \cdot \left(v - \frac{s_y}{2} + \frac{s_y}{2} \cdot \cos\left(\frac{v\pi}{s_y}\right) - \frac{s_y}{\pi} \cdot \sin\left(\frac{v\pi}{s_x}\right)\right) \cdot \left(1 - \cos\left(\frac{u\pi}{s_x}\right)\right) \end{array} \right. \tag{16}$$

Referring now to FIG. 10, a flow chart illustrates processes in a method 300 of determining a layout density for a semiconductor device layout, in accordance with an embodiment of the present disclosure. Method 300 begins with reading 310 a database file of an integrated circuit (IC) layout. In one embodiment, the IC layout is represented by polygons, such as rectilinear polygons with sides extending along the x-axis and y-axis. In some embodiments, the polygons are rectangles. In other embodiments, the polygons can be represented by a plurality of rectangles merged or joined together to define a single shape enclosed by a rectilinear boundary. The data contained in the database file represents a layout of a tangible integrated circuit to be manufactured from the database file. For example, the database is an electronic file provided in a GDSII or Oasis format or any other suitable format. The database file can be read into memory or stored electronically, in accordance with some embodiments.

Method 300 continues with analyzing 320 a portion of the layout within a window. Analyzing 320 the layout within the window includes identifying whole polygons or partial polygon areas within the window and the position of each polygon or part thereof. For example, the window has a square shape with a window width, where the window is located on the layout at an indentified window position. Other polygonal shapes are acceptable, such as a rectangle, circle, hexagon, or other regular or irregular shape. In some embodiments, the window has a window width from 1 μm to 500 μm or greater, including 1-50 μm, 10-30 μm, 30-60 μm, 50-100 μm, 100-200 μm, 200-300 μm, and 300-500.

Method 300 continues with determining 330 a local density of polygons or polygonal areas within the window. As discussed above, the local density can be calculated by determining the ratio of the sum of all polygonal areas within the window to the total window area. Determining 300 the local density can be performed in some embodiments using a kernel function. In some embodiments, the area of each whole or partial polygon within the window is weighted according to a weighting function, where the weight function gives a weight to a particular polygon within the window based on a position of that particular polygon within the window. For example, the weighting function gives greater weight to polygonal areas towards the center of the window than to polygonal areas towards the boundary of the window. In some embodiments, the weighting function is a raised cosine function. For example, the raised cosine weighting function is expressed by $1+\cos(2\Pi/w \cdot (x-x_p))$, wherein w is the window width; x is an absolute x-axis position along the entire block or an x-axis position of the polygonal area along the window width; and $x_p$ is an x-axis position of a center of the window 130.

Method 300 continues with reporting 340 the local density of layout at the window position to a file.

In some embodiments, method 300 optionally includes searching 370 the file for any value of the local density of polygons that is outside a predefined acceptable range. In some embodiments, method 300 optionally further includes correcting 380 the local density of the layout for any window position where the value of the local density of polygons is outside the predefined acceptable range. In some embodiments, for example, the acceptable range of density is from 35% to 50%, from 40% to 60%, from 30% to 60%, from 40% to 50%, or any other suitable range.

Method 300 optionally includes moving 350 the window stepwise to a new window position on the layout, where a step size is less than the window width. For each new window position, method determines 330 a local density and reports 340 the local density to the file. After each new window position, the window is moved 350 to another new window position. For example, the window is moved stepwise horizontally and vertically across the layout until all areas of the layout are analyzed 320. In some embodiments, the step size of each movement 350 is about half the window width. Other suitable step sizes are acceptable where the step size is less than half the window width.

Figure 18:
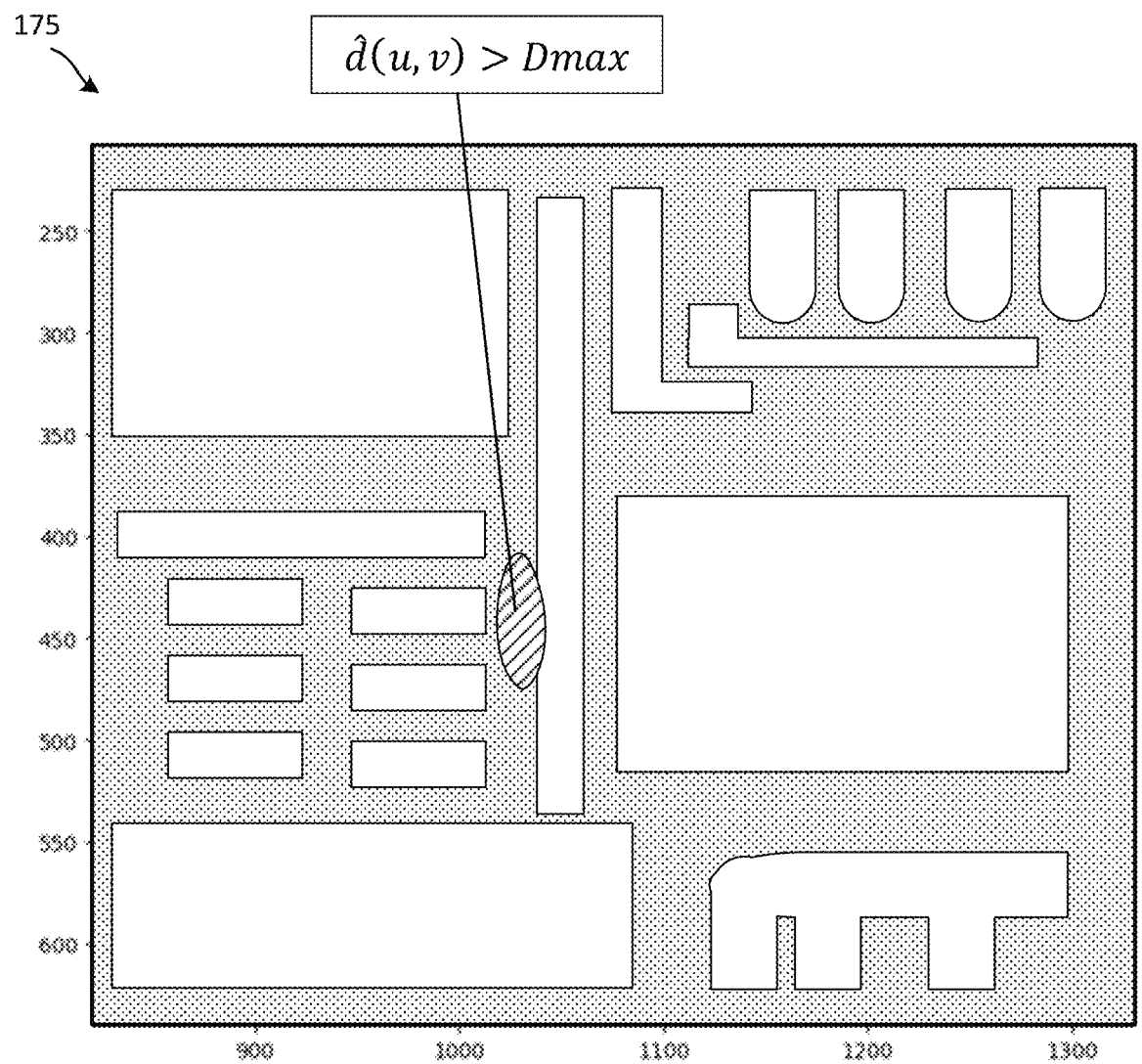
FIG. 18 illustrates an example output from a method of determining layout density and identifying a density violation, in accordance with an embodiment of the present disclosure.

Optionally, method 300 outputs 390 a density or layout map 175 (shown, e.g., in FIG. 18). For example, the density map is saved to file or displayed to the user. In one embodiment, the density map 175 includes density values and/or density gradients for layout 102. In some embodiments, the layout map is a topographical map displayed to the user or saved to a file. In one example embodiment, the layout map indicates density values based on color or grayscale intensity. In some embodiments, the layout map includes density contour lines, such as shown in FIG. 9, to indicate density values or gradient values. The density map may represent one or more features of layout density, local density, density gradient, density contour lines, maximum density value, minimum density value, local density value, or a density violation. In some embodiments, the map includes indicia representative of one or more of such features. For example, color or shading is used to identify density values across the density map. In another example, symbols, words, or other characters are used to identify values or locations of certain values. Numerous variations and embodiments will be apparent in light of the present disclosure. In some embodiments, the layout map includes numerical or symbolic representations of density and/or density gradient values.

Figure 11A:
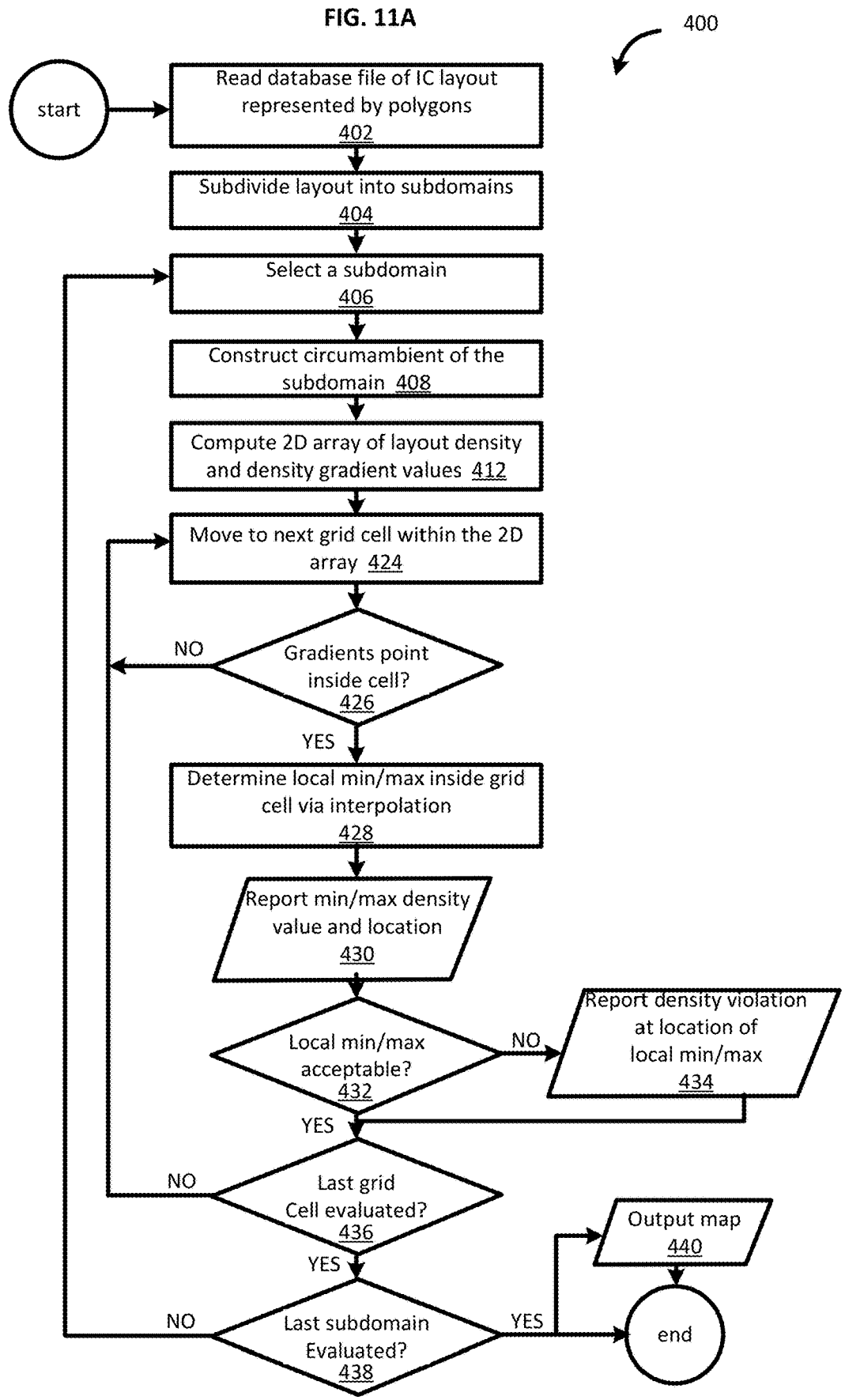
FIG. 11A illustrates a process flow for a method of determining density of an integrated circuit, die, or chip, in accordance with an embodiment of the present disclosure.

Referring now to FIG. 11A, a flow chart illustrates processes in a method 400 of determining a layout density for a semiconductor device layout, in accordance with an embodiment of the present disclosure. Method 400 begins with reading 402 a database file of an integrated circuit (IC) layout. In one embodiment, the IC layout is represented by polygons, such as rectilinear polygons with sides extending along the x-axis and y-axis. In some embodiments, the polygons are rectangles. In other embodiments, the polygons can be represented by a plurality of rectangles merged or joined together to define a single shape enclosed by a rectilinear boundary. The data contained in the database file represents a layout of a tangible integrated circuit to be manufactured from the database file. For example, the database is an electronic file provided in a GDSII or Oasis format or any other suitable format. The database file can be read into memory or stored electronically, in accordance with some embodiments.

Figure 12:
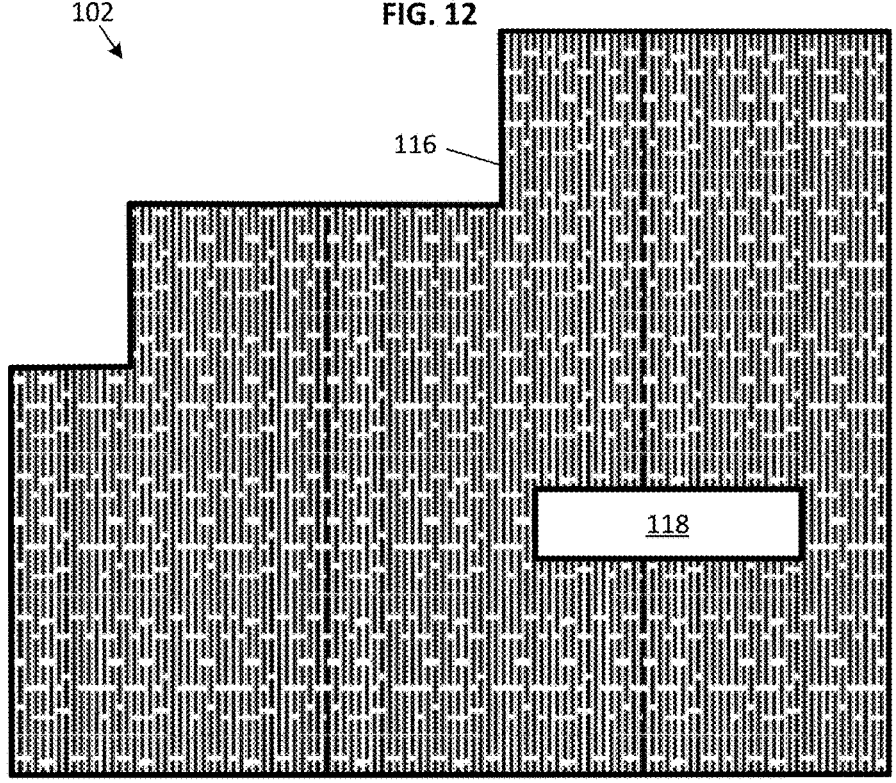
FIG. 12 illustrates an example integrated circuit layout with a rectilinear shape and including a hole, in accordance with an embodiment of the present disclosure.

Method 400 continues with subdividing 404 the layout of the IC into rectangular subdomains. FIG. 12 illustrates an example of a layout 102 with a rectilinear boundary 116. Layout 102 may be the layout of a chip module or hard-IP block. Layout 102 includes a hole or void 118 having a density of zero. Layout 102 can contain one or more hole 118, as will be appreciated. For example, the hole 118 is a location on the integrated circuit layout 102 with no devices or connections. Hole 118 may be a region that is much greater in area than any devices or other features in the layout 102. Hole 118 can be a region that is set aside, for example, for purposes related to packaging or for later integration of hard-IP block layout into a system-on-chip product design.

Figure 13:
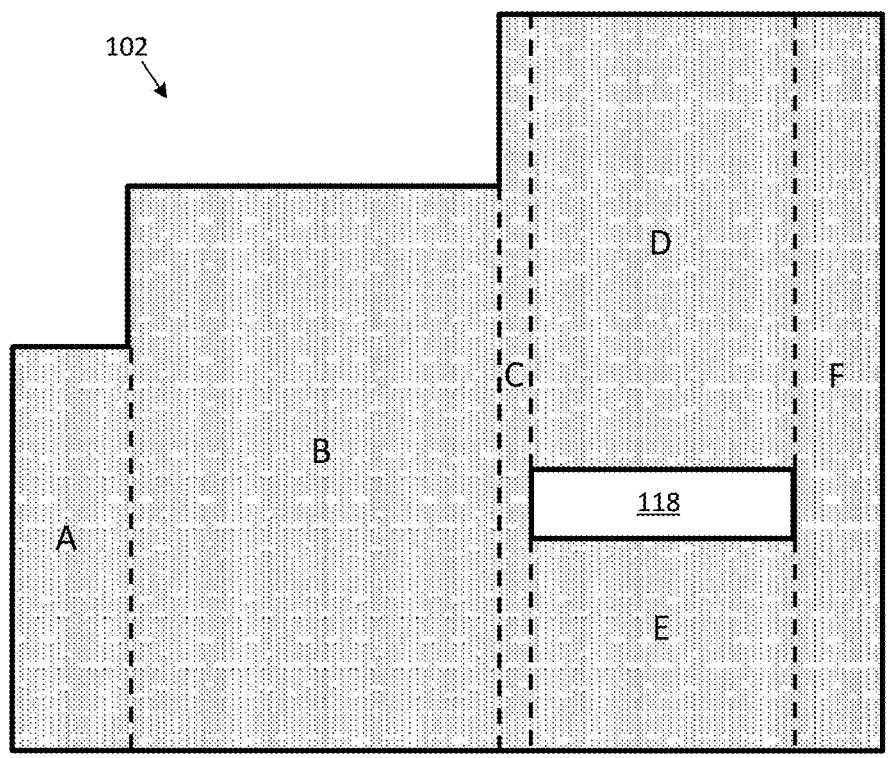
FIG. 13 illustrates the layout of FIG. 12 after dividing the layout into rectangular subdomains, in accordance with an embodiment of the present disclosure.

FIG. 13 illustrates an example of subdivisions A-F assigned to layout 102 of FIG. 12. Each subdivision is a simple rectangle (without hole(s) 118). For example, a polygon rectangulation algorithm can be used, including one that minimizes the number of subdivisions or edge length. Numerous methods can be used to subdivide the layout 102 into adjacent, non-overlapping rectangular subdivisions that fit within the boundary 116 of layout 102 and occupy all areas of the layout 102 other than voids 118, as will be appreciated.

Method 400 continues with selecting 406 a rectangular subdomain of the IC layout 102. Selecting 406 the rectangular subdomain can be selecting the first rectangular subdomain to be analyzed, or can be selecting the next rectangular subdomain to be analyzed.

Method 400 continues with constructing 408 a circumambient of the selected rectangular layout subdomain. In one embodiment, constructing 408 the circumambient includes defining a rectangle surrounding the selected rectangular layout subdomain. For example, each side of the rectangle surrounding the subdomain is spaced by an equal amount from the respective side of the subdomain. Constructing 408 the circumambient then proceeds with mirroring or copying an adjacent portion of the rectangular layout subdomain into the rectangle surrounding the subdomain and the subdomain's boundary. For example, a top portion of the subdomain is mirrored into the region of the rectangle surrounding the subdomain along and directly above the top of the subdomain boundary. Similarly, corner regions of the subdomain are mirrored into respective corners of the rectangle surrounding the subdomain, side regions of the subdomain are mirrored into respective sides of the rectangle surrounding the subdomain, and the bottom region of the subdomain is mirrored into the region along the bottom boundary of the subdomain. Each mirrored region from the subdomain has the same size as the region it fills. In some embodiments, the portion of the subdomain mirrored into the rectangle is less than half of the width or height of the subdomain, such as less than 40%, less than 30%, less than 25%, less than 20%, less than 15%, less than 10%, or less than 5%.

Figure 14A:
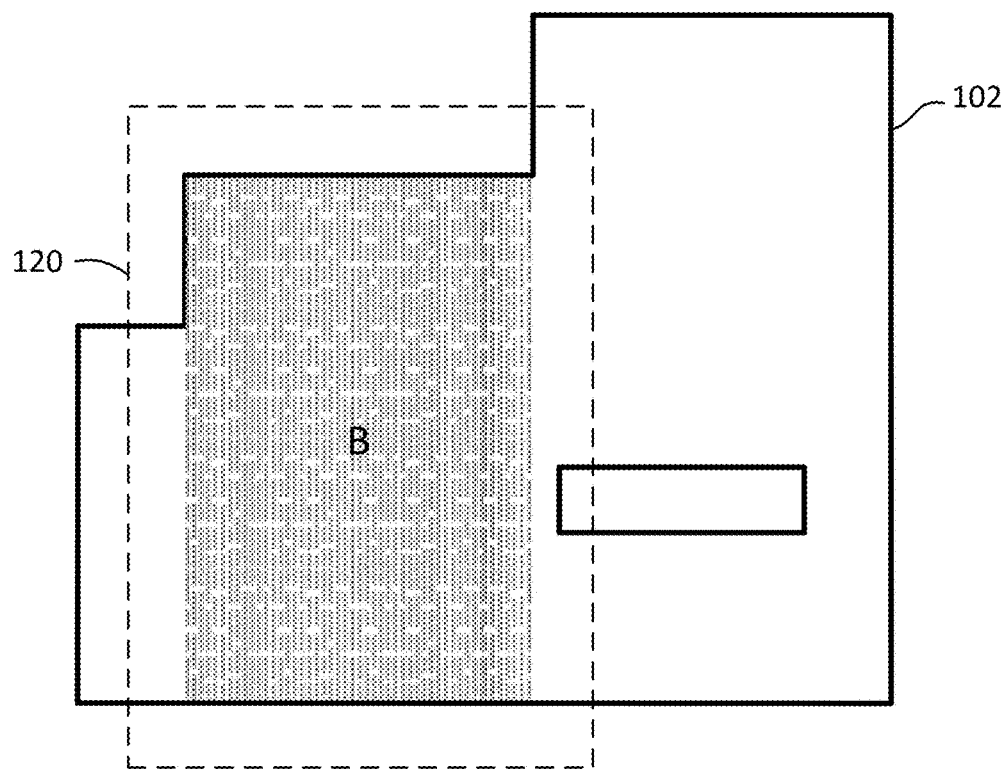
FIG. 14A illustrates an example of defining a rectangle around a subdomain as part of constructing a circumambient of the subdomain, in accordance with an embodiment of the present disclosure.

FIG. 14A illustrates an example of subdomain B with a rectangle 120 surrounding it to define circumambient 122. The rectangle 120 must be spaced from the boundary of the subdomain by a distance no less than the window size of the kernel function plus the step size used for window stepping, in accordance with some embodiments. As shown in FIG. 14A, the result is that rectangle 120 is spaced from the boundary of subdomain B by a distance corresponding to about 25-30% of the width (about 15-20% of the height) of subdomain B. Circumambient 122 between subdomain B and rectangle 120 is filled at least in part with regions mirrored from adjacent portions of subdomain B. For example, side regions 126 are mirrored into respective side regions of circumambient 122, top and bottom regions 128 are mirrored into respective top and bottom regions of circumambient 122, and corner regions 124 are mirrored into respective corners of circumambient. As shown in FIG. 14, each corner region 124 of subdomain B is common with part of a side region 126 and a top or bottom region 128.

Figure 14B:
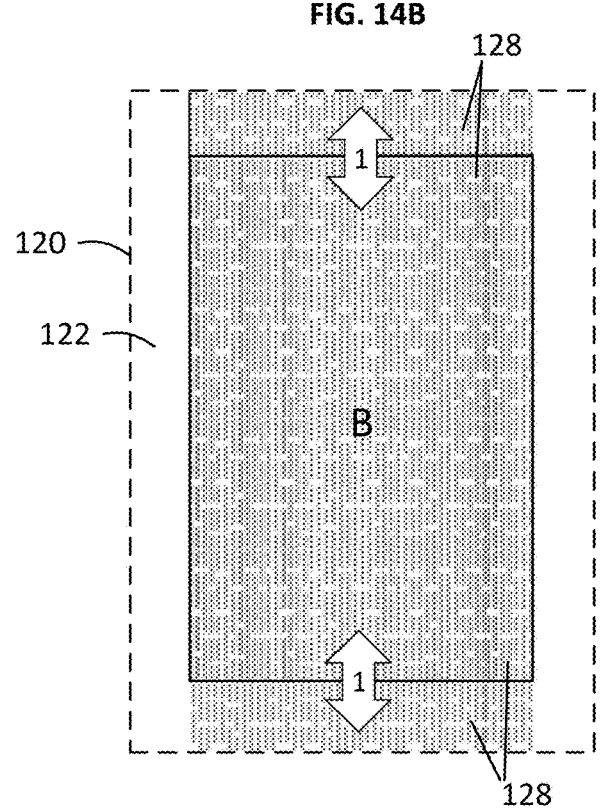
FIG. 14B illustrates an example of mirroring top and bottom portions of a subdomain into the rectangle surrounding it to construct the circumambient, in accordance with an embodiment of the present disclosure.
Figure 14C:
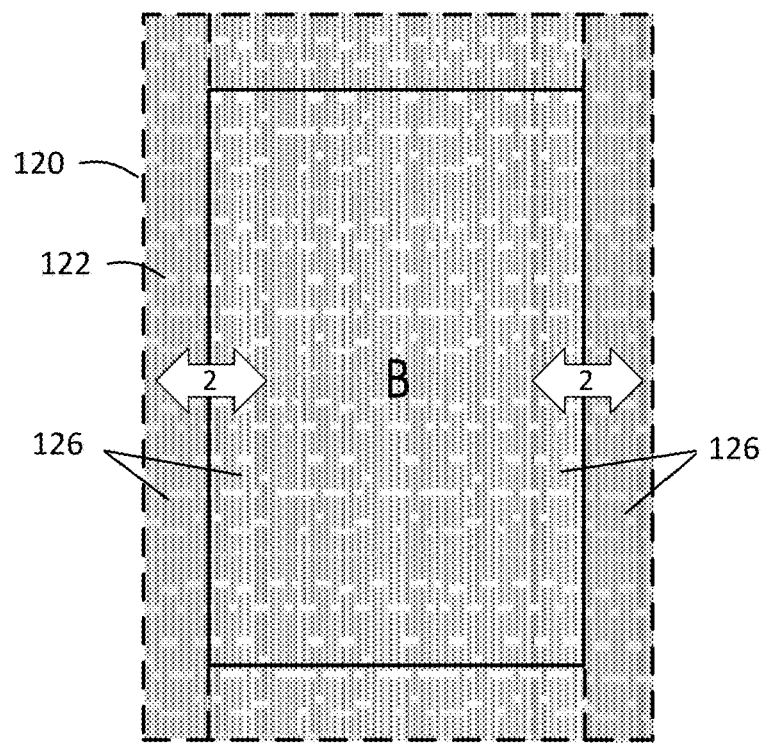
FIG. 14C illustrates an example of mirroring side portions of a subdomain into the rectangle surrounding it as part of the process of constructing the subdomain circumambient, in accordance with an embodiment of the present disclosure.
Figure 14D:
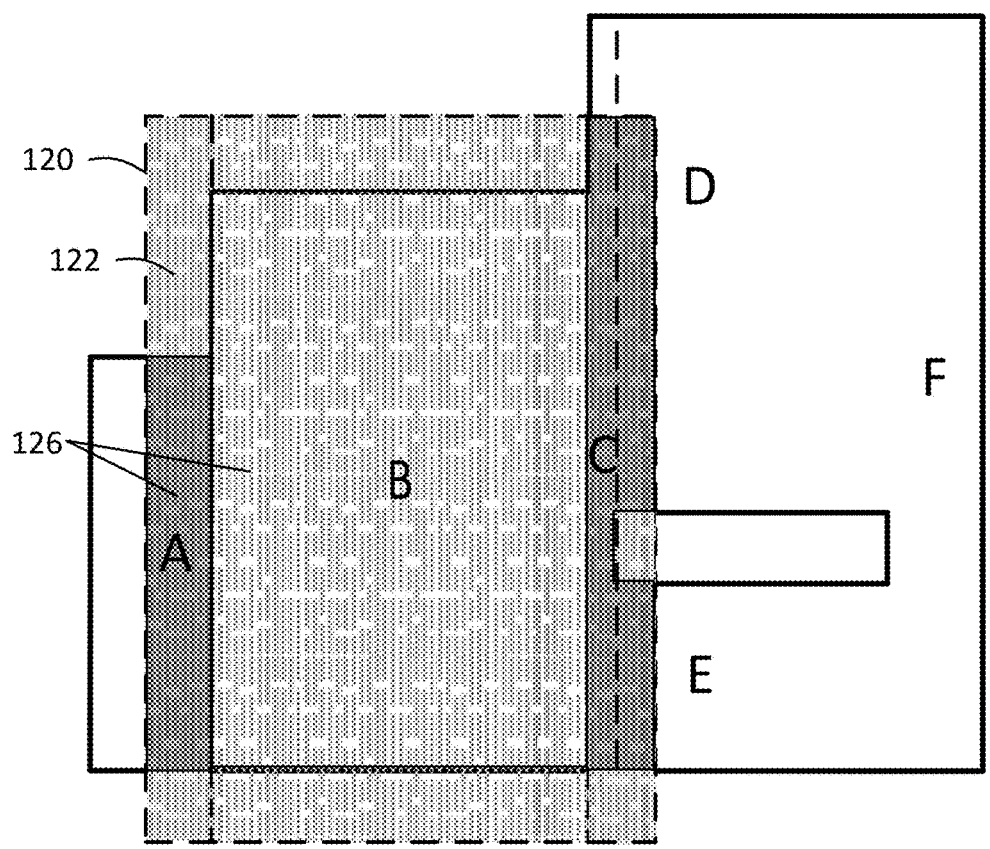
FIG. 14D illustrates using portion of adjacent subdomains that intersect the rectangle surrounding a subdomain as part of the process of constructing the circumambient, in accordance with an embodiment of the present disclosure.
Figure 14E:
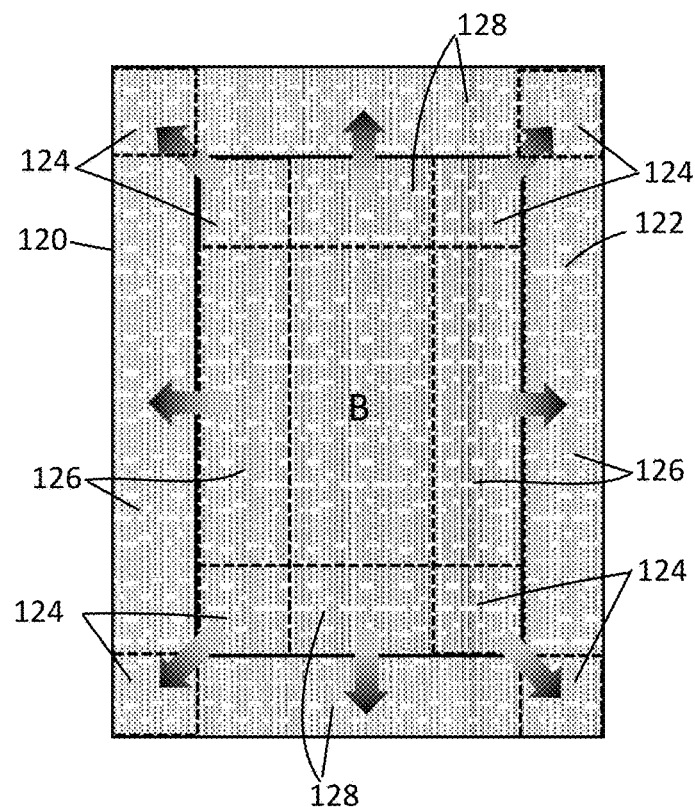
FIG. 14E illustrates an example of a subdomain and its circumambient constructed with portions of the subdomain, in accordance with an embodiment of the present disclosure.

One approach to constructing 408 the circumambient is shown in FIGS. 14B-14D. In FIG. 14B, end portions 128 of subdomain B are mirrored into the region of circumambient 122 defined by rectangle 120. In FIG. 14C, side portions 126 (which include part of mirrored end portions 128) are mirrored into circumambient 122. In FIG. 14D, intersecting regions 123 of circumambient 122 that overlap or intersect adjacent subdomains are either excluded from the mirroring operation, or the intersecting region 123 is filled with the contents of the adjacent subdomain that intersects the circumambient 122. As shown in FIG. 14D, for example, portions of subdomains A, C, D, and E are used to fill or define side portions 126 of circumambient 122. FIG. 14E illustrates an example of circumambient 122 completed after mirroring portions of subdomain B.

Figure 11B:
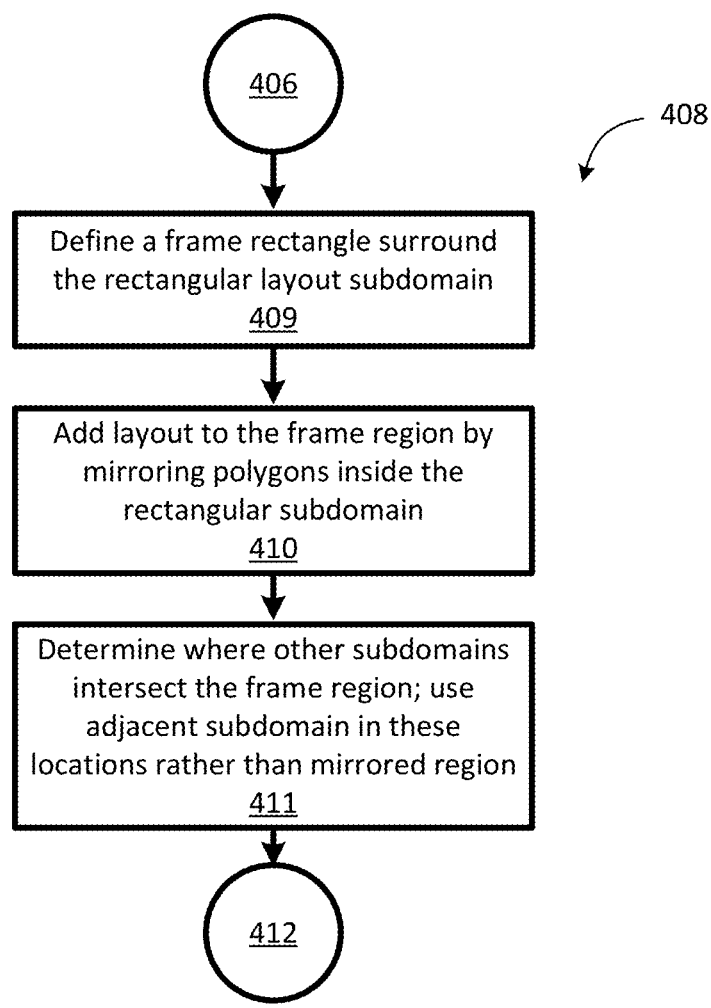
FIG. 11B illustrates a process flow diagram for a method of constructing a circumambient of a layout subdomain as described in the method of FIG. 11A, in accordance with an embodiment of the present disclosure.

Referring to FIG. 11B, additional details of process 408 are illustrated in a process flow, in accordance with an embodiment of the present disclosure. Constructing 408 the circumambient includes defining 409 a rectangular frame surrounding the boundary of the subdomain and mirroring 410 polygons inside the subdomain into the region between the frame and the subdomain boundary. Method 400 determines 410 where adjacent subdomains intersect the frame region or overlap the frame region, and in such locations replaces use of the mirrored polygons with use of the polygons of the adjacent subdomain instead. That is, rather than writing over or replacing polygons of the adjacent subdomain, for example, polygons are mirrored 410 to the extent that the region between the frame and the subdomain boundary does not contain polygons from an adjacent subdomain.

Method 400 continues with determining 412 an array of layout density values and density gradient values. For example, layout density and density gradient are determined for locations defined by a two-dimensional N×M grid on the subdomain and at least part of the circumambient 122. In one embodiment, the grid has an origin at $o_x$, $o_y$. The grid has N locations along the x-axis spaced by an x-axis step size of $s_x$ and M locations along the y-axis spaced by a y-axis step size of $s_y$. Each grid location represents a sample point P for which the layout density and density gradient can be determined.

Figure 15:
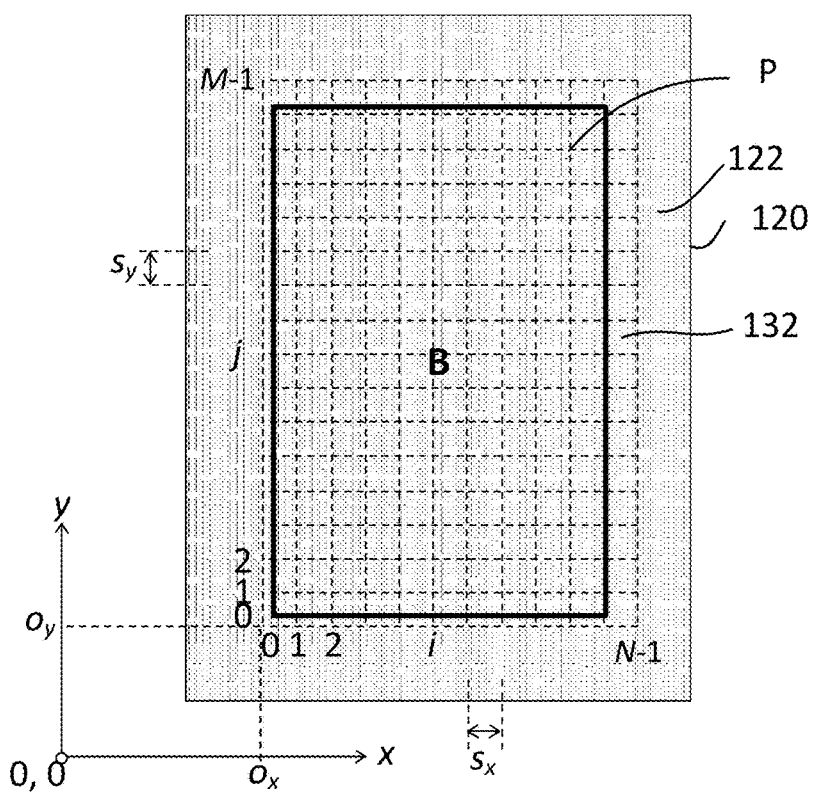
FIG. 15 illustrates an example of defining a grid of sample points and grid cells over a subdomain and part of the circumambient, in accordance with an embodiment of the present disclosure.

FIG. 15 illustrates an example of an N×M sampling grid over subdomain B and part of the circumambient 122 between subdomain B and rectangle 120. The origin of the sampling grid is located at $o_x$, $o_y$, which may be the same or different from the layout origin at 0, 0 depending on the subdomain being analyzed. In FIG. 15, sample points P are found in an array of grid locations defined by the intersection of the N vertical grid lines and M horizontal grid lines. A cell 132 is defined by four adjacent sample points P (e.g., grid locations) defining a rectangle or square. As discussed above, density and gradient values can be determined at each sample point P and the density within a cell 132 can be interpolated from this information.

Figure 11C:
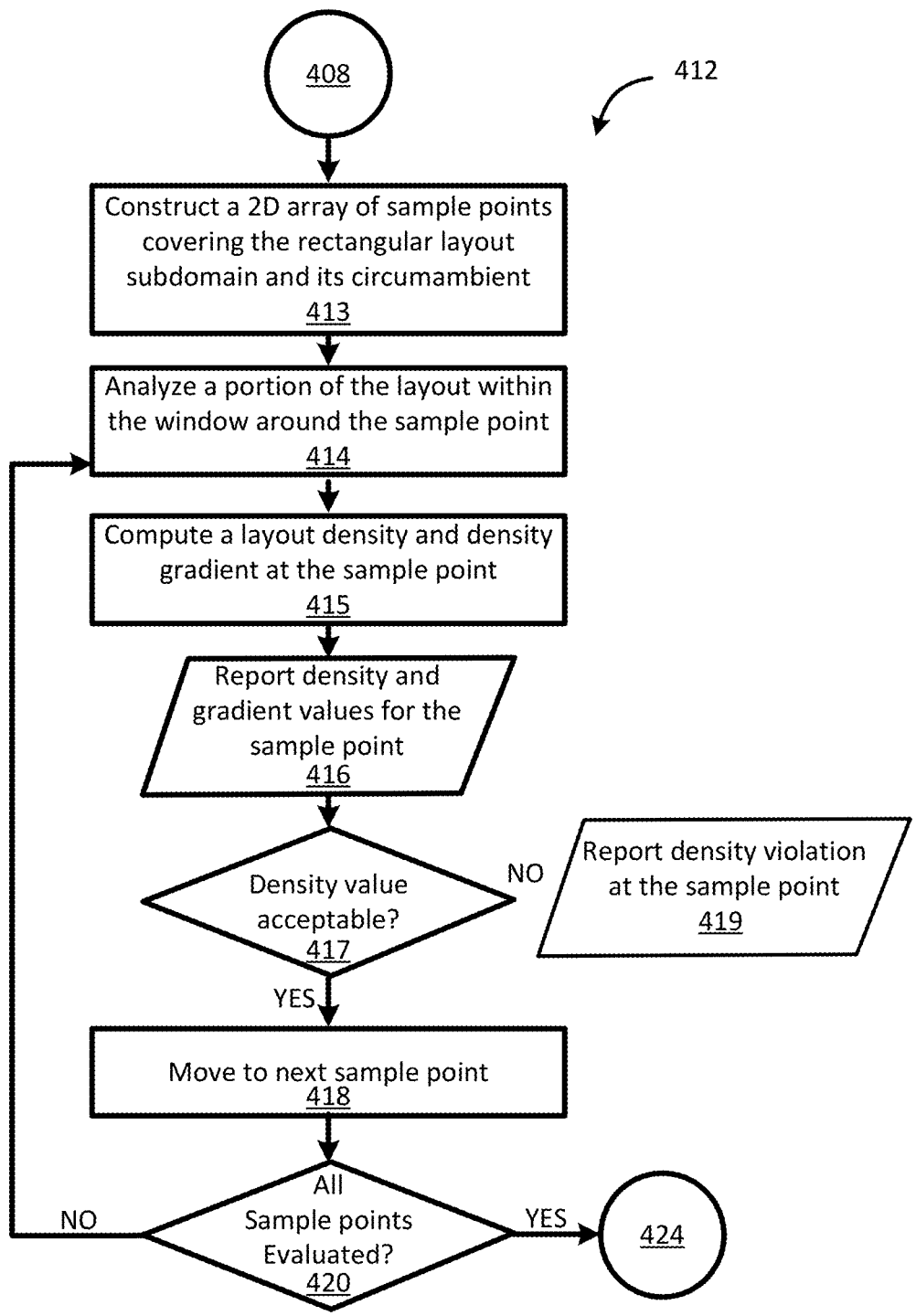
FIG. 11C illustrates a flow diagram for processes in a method of computing an array of density and density gradient values described in the method of FIG. 11A, in accordance with an embodiment of the present disclosure.

Referring to FIG. 11C, additional details of process 412 are shown, in accordance with an embodiment of the present disclosure. Determining 412 an array of layout density and gradient values includes constructing 413 a two-dimensional array of sample points P over the rectangular layout subdomain and at least a portion of its circumambient 122. Method 400 analyzes 414 a portion of the layout that is located within the window located at sample point P and computes 415 a local density and local density gradient at the sample point. For example, computing 415 the local density is performed by convolution of polygon areas with a center-weighted bandwidth-limiting kernel. An example of such kernel is the raised cosine function of Equation 7. Local density values and density gradients are reported 416 for each sample point P. Density gradient values can be used to find local minimum or maximum density values. The local density value is checked 417 to determine if it is within an allowed range. If not, the density if reported as a density violation at the location of the sample point P. If the density value is within the allowed range, method 400 moves 418 to the position of the next sample point P. If not all sample points have been analyzed, process 412 continues with the next sample point P, beginning with selecting 414 a portion of the layout at the new position as discussed above. If all sample points have been analyzed, process 412 is complete.

Method 400 continues with moving 424 to a grid cell 132 in the two-dimensional grid defined between four adjacent grid locations (e.g., sample points P). For example, the grid cell is the rectangular region defined between four grid locations i, i+1, j, and j+1. The vertices of the grid cell 132 also correspond to sample points P in accordance with some embodiments. Method 400 determines 426 whether gradients at the vertices of the grid cell 132 point inside the cell 132. For example, the magnitude and direction of the gradient is calculated at each vertex (e.g., sample point P) of the grid cell 132. When all of the gradients for the cell point inside the cell, a maximum value is located within the grid cell 132. When all of the gradients are either zero or point inside the cell, a maximum density value is either within the grid cell 132 or along a boundary of the grid cell 132. When all of the gradients point outside of the grid cell 132, a density minimum can be found within the grid cell 132. If all gradients do not point inside the cell, method 400 repeats by moving 424 to the next grid cell and determining 426 whether gradients of the grid cell point inside the cell 132.

Method 400 continues with determining 428 a local maximum or minimum value inside a grid cell. In one embodiment, determining the local maximum or minimum is performed by interpolation. For example, Equation 16 can be used to find a local maximum or minimum value. The value and location of the local maximum or minimum is reported 430. For example, the location and/or value is saved to a database, saved in memory, displayed to a user, or communicated by wired or wireless means to a computer, server, or user device. Numerous variations and embodiments of reporting 430 can be used, as will be appreciated.

Method 400 continues by determining 432 whether the local maximum or minimum density value is within a predefined range of allowed values. If the local maximum or minimum density value is not within the range of allowed values, method 400 reports 434 the density violation at the location of the grid cell 132. If the local maximum or minimum density value is within the range of allowed values, method 400 continues again from process 424 until the last grid cell 132 has been analyzed 436. Method 400 repeats from process 406 for each subdomain of the IC layout until having evaluated 438 the last subdomain, in accordance with some embodiments.

Optionally, method 400 outputs 440 a density or layout map 175 (shown, e.g., in FIG. 18). For example, the density map is saved to file or displayed to the user. In one embodiment, the density map 175 includes density values and/or density gradients for layout 102. In some embodiments, the layout map is a topographical map displayed to the user or saved to a file. In one example embodiment, the layout map indicates density values based on color or grayscale intensity. In some embodiments, the layout map includes density contour lines, such as shown in FIG. 9, to indicate density values or gradient values. The density map may represent one or more features of layout density, local density, density gradient, density contour lines, maximum density value, minimum density value, local density value, or a density violation. In some embodiments, the map includes indicia representative of one or more of such features. For example, color or shading is used to identify density values across the density map. In another example, symbols, words, or other characters are used to identify values or locations of certain values. Numerous variations and embodiments will be apparent in light of the present disclosure. In some embodiments, the layout map includes numerical or symbolic representations of density and/or density gradient values.

In some embodiments, methods 300 or 400 optionally include outputting a density violation report, which can include a layout map 175 (shown, e.g., in FIG. 18). Output may be a visual display to a user interface, an output file, a print, or other acceptable format. Methods 300 or 400 optionally include making changes to the layout 102 based on the output or reporting of violations, density values, and/or gradient values.

Figure 16:
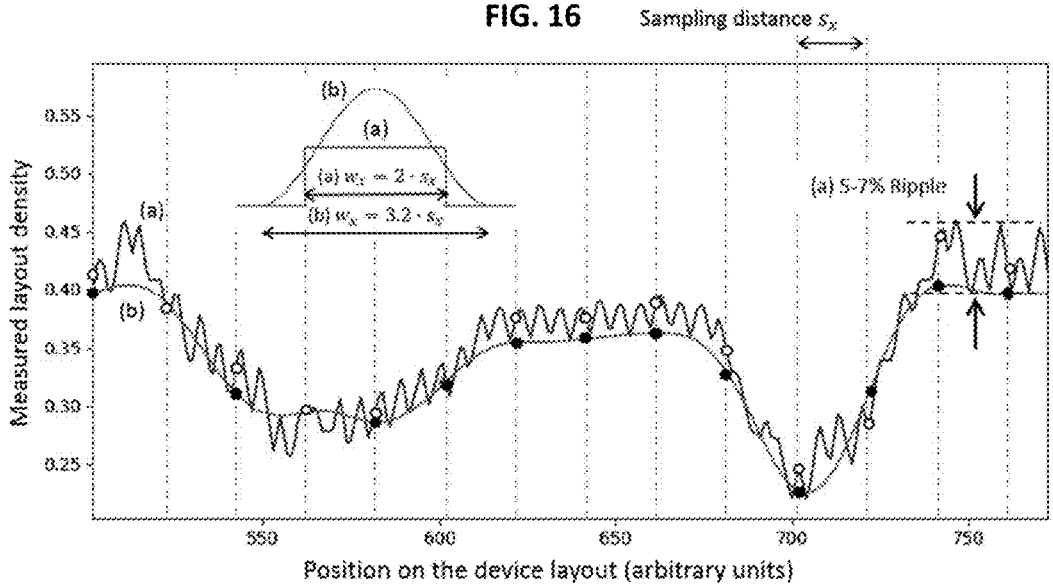
FIG. 16 illustrates a plot of measured layout density versus layout position showing differences in results between a process performed using (a) an equal-weight kernel function and (b) a center-weighted bandwidth-limiting kernel function, in accordance with embodiments of the present disclosure.

Referring now to FIG. 16, a plot of measured layout density versus position on the device layout 102 compares density measurement using convolution with two different kernel functions. Wavy line (a) is the result of density measurement using a uniform weighting kernel with the window size equal to two times the step size. Line (b) is the result of density measurement using a center-weighted bandwidth-limiting kernel. Density values measured using the uniform weight kernel exhibit high frequency variation. As a result, density values reported by sampling the density at stepping grid positions (indicated by unfilled circles in FIG. 16) can vary significantly depending on a small variation in position on the device layout 102. For example, shifting the layout of a hard-IP block layout to the left or right can change the reported density values substantially enough to cause violations of layout density requirements to appear or disappear. As shown at the right side of FIG. 16, density measurements using the uniform weighting kernel exhibit a 5-7% ripple or error. In contrast, density values measured using a bandwidth-limited kernel function exhibit little or no high frequency variation, and therefore, values sampled at stepping grid positions will show little to no variation when the position is changed slightly on the layout of the die, chip, or integrated circuit.

Figure 17A:
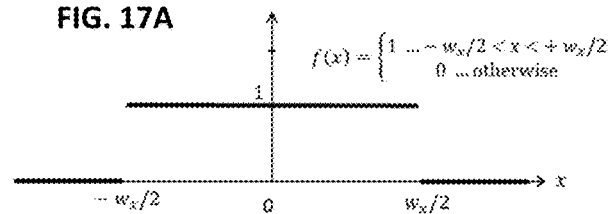
FIG. 17A illustrates a plot showing sampling fundamental and harmonics associated with density measurements of a layout using an equal-weight kernel, in accordance with an embodiment of the present disclosure.
Figure 17B:
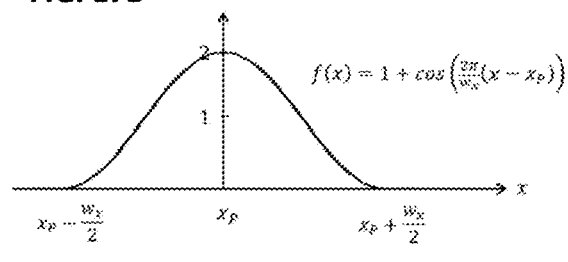
FIG. 17B illustrates a plot showing sampling fundamental and harmonics associated with density measurements of a layout using a center-weighted bandwidth-limiting kernel, in accordance with an embodiment of the present disclosure.

FIGS. 17A and 17B illustrate plots of frequency spectra of kernel functions used for density measurement. The sampling frequency $\omega$ in each plot is $4\Pi/s_x$. In each plot, the left-most and largest peak, the fundamental peak, represents the main contribution to the density measurement. In each plot, smaller peaks to the right of the fundamental represent an aliasing error, or harmonic, due to the sampling approach of stepping the window 130 across the layout 102. A true and accurate measurement of area, and therefore of local density and overall density can be obtained by including only the fundamental peak, in accordance with some embodiments. Harmonic peaks are erroneous contributions to the density measurement. Thus, to the extent a weighting function excludes harmonic peaks, the accuracy of the layout density measurement can be improved.

In FIG. 17A, density is measured using the equal weighting kernel of Equation 3, where polygon areas within the window are given equal weight. Such method exhibits ineffective suppression of spectral components greater than ½ the sampling frequency $\omega$. The plot of FIG. 17A includes many harmonic peaks to the right of fundamental peak.

In FIG. 17B, density is measured using the center-weighted bandwidth-limiting kernel of Equation 7. Such method exhibits effective suppression of spectral components in the layout density with frequencies greater than ½ the sampling frequency $\omega=4\pi/s_x$. The plot of FIG. 17B includes one harmonic peak (and additional harmonic peaks to a negligible amount) to the right of fundamental peak. By reducing or eliminating the contribution of harmonics, the measurement of layout density is more accurate.

FIG. 18 illustrates an example of an output of method 300 or method 400, in accordance with some embodiments. In this example, the output is a map 175 of interpolated layout density showing a zone of density violation where the interpolated density d̂(u, v) is greater than a predetermined maximum density value, Dmax.

Example System

Figure 19:
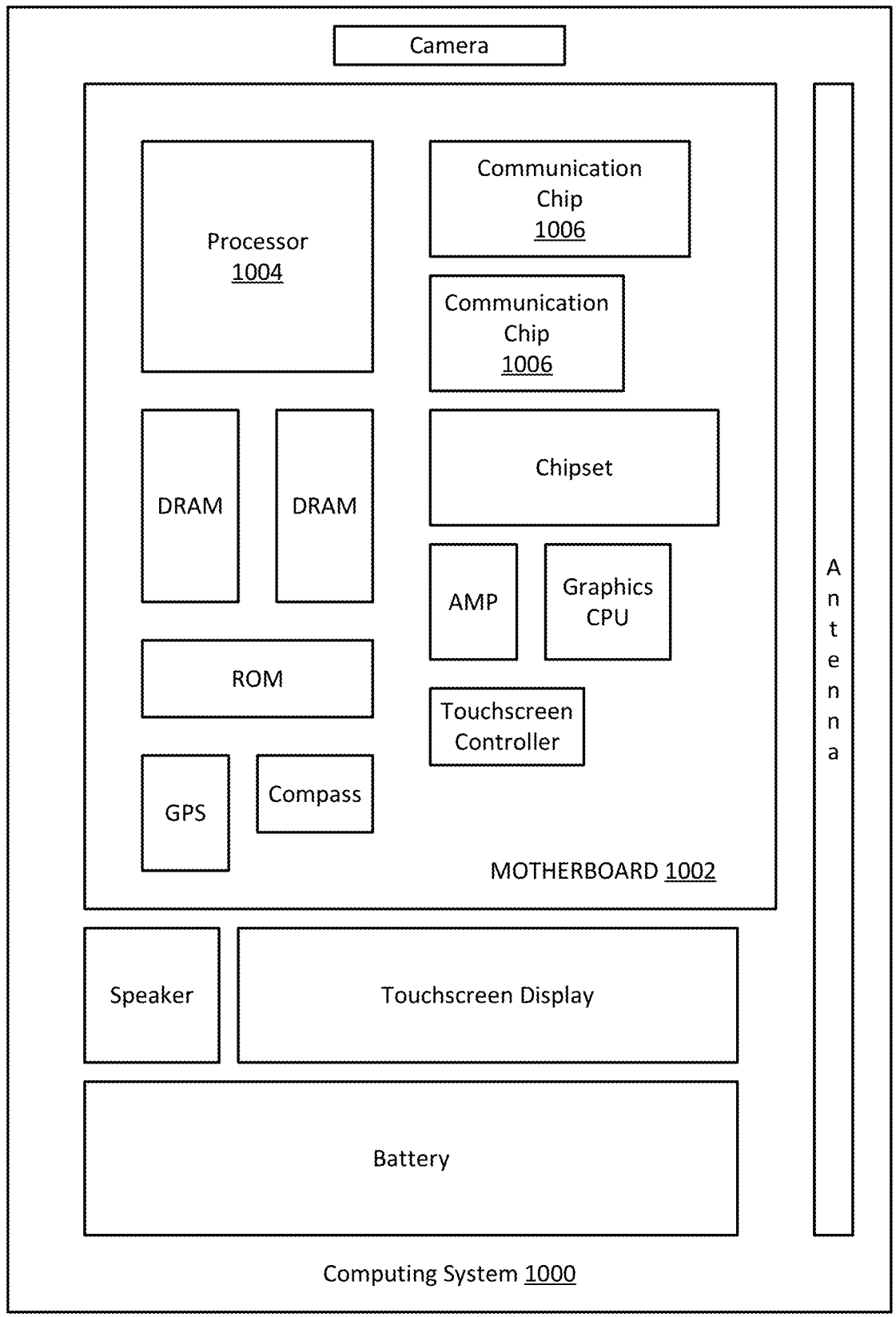
FIG. 19 illustrates an example computing system that may be used to perform a method of determining layout density, or incorporating integrated circuits analyzed using a method of determining layout density, in accordance with an embodiment of the present disclosure.

FIG. 19 illustrates a computing system 1000 implemented with integrated circuit structures or techniques disclosed herein, according to an embodiment of the present disclosure. For example, the computing system 1000 may include chips or integrated circuits that are analyzed using method of determining a device layout density. In another example, the computing system 1000 can be used to implement methods of determining layout density. As can be seen, the computing system 1000 houses a motherboard 1002. The motherboard 1002 may include a number of components, including, but not limited to, a processor 1004 (including embedded memory (e.g., eDRAM) incorporating thin-film transistors as described herein) and at least one communication chip 1006, each of which can be physically and electrically coupled to the motherboard 1002, or otherwise integrated therein. As will be appreciated, the motherboard 1002 may be, for example, any printed circuit board, whether a main board, a daughterboard mounted on a main board, or the only board of system 1000, to name a few examples.

Depending on its applications, computing system 1000 may include one or more other components that may or may not be physically and electrically coupled to the motherboard 1002. These other components may include, but are not limited to, volatile memory (e.g., dynamic random-access memory (DRAM)), nonvolatile memory (e.g., read-only memory (ROM), resistive random-access memory (RRAM), and the like), a graphics processor, a digital signal processor, a crypto (or cryptographic) processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth). Any of the components included in computing system 1000 may include one or more integrated circuit structures or devices (e.g., one or more memory cells, one or more memory cell arrays) formed using the disclosed techniques in accordance with an example embodiment. In some embodiments, multiple functions can be integrated into one or more chips (e.g., for instance, note that the communication chip 1006 can be part of or otherwise integrated into the processor 1004).

The communication chip 1006 enables wireless communications for the transfer of data to and from the computing system 1000. The term "wireless" and its derivatives may be used to describe circuits, devices, systems, methods, techniques, communications channels, and the like that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including, but not limited to, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, millimeter wave, and beyond. The computing system 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing system 1000 includes an integrated circuit die packaged within the processor 1004. In some embodiments, the integrated circuit die of the processor includes onboard circuitry that is implemented with one or more integrated circuit structures or devices (e.g., one or more memory cells) formed using the disclosed techniques, as variously described herein. The term "processor" may refer to any device or portion of a device that processes, for instance, electronic data from registers and/or memory to transform that electronic data into other electronic data that may be stored in registers and/or memory.

The communication chip 1006 also may include an integrated circuit die packaged within the communication chip 1006. In accordance with some such example embodiments, the integrated circuit die of the communication chip includes one or more integrated circuit structures or devices (e.g., one or more memory cells) formed using the disclosed techniques as variously described herein. As will be appreciated in light of this disclosure, note that multi-standard wireless capability may be integrated directly into the processor 1004 (e.g., where functionality of any chips 1006 is integrated into processor 1004, rather than having separate communication chips). Further note that processor 1004 may be a chip set having such wireless capability. In short, any number of processor 1004 and/or communication chips 1006 can be used. Likewise, any one chip or chip set can have multiple functions integrated therein.

In various implementations, the computing device 1000 may be a laptop, a netbook, a notebook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, a digital video recorder, or any other electronic device that processes data or employs one or more integrated circuit structures or devices (e.g., one or more memory cells) formed using the disclosed techniques, as variously described herein.

FURTHER EXAMPLE EMBODIMENTS

Example 1 is a computer program product including one or more non-transitory machine-readable mediums encoded with instructions, that when executed by one or more processors, cause a process to be carried out for determining a density of an integrated circuit layout, the process comprising reading a database file containing data representing an integrated circuit layout with polygons; defining a sample window located at a sample point on the integrated circuit layout; determining a local density of polygons within the sample window, the local density being a convolution of a kernel function and a layout function for determining an area of the polygons within the sample window; and determining a density of the integrated circuit layout based on the local density of polygons.

Example 2 includes the subject matter of Example 1, wherein the sample point is one of an array of sample points distributed across the integrated circuit layout, wherein determining the local density of polygons within the sample window is performed at each of the sample points in the array.

Example 3 includes the subject matter of Examples 1 or 2, wherein the process further comprises interpolating a local density of a rectangular grid cell defined between adjacent sample points in the array of sample points.

Example 4 includes the subject matter of any of Examples 1-3, wherein the kernel function is a center-weighted bandwidth-limiting kernel.

Example 5 includes the subject matter of any of Examples 1-4, wherein the process further comprises moving the sample window stepwise to a plurality of additional sample points, wherein determining the density of the integrated circuit layout includes determining the local density determined at the sample point and each of the additional sample points.

Example 6 includes the subject matter of any of Examples 1, wherein determining the density of the integrated circuit layout comprises defining a grid of sample points on the integrated circuit layout; moving the sample point stepwise to sample points on the integrated circuit layout; and determining a local density for each sample point in the grid of sample points.

Example 7 includes the subject matter of Example 6, wherein the process further comprises interpolating a local density of a rectangular grid cell defined between adjacent sample points in the grid of sample points.

Example 8 includes the subject matter of Example 7, wherein the interpolating the local density is based on density gradients at each of the adjacent sample points defining the rectangular grid cell.

Example 9 includes the subject matter of Example 8, wherein the process further comprises determining a local density minimum or local density maximum within the rectangular grid cell.

Example 10 includes the subject matter of Example 9, wherein determining the local density minimum or local density maximum includes determining whether density gradients at the adjacent sample points defining the rectangular grid cell are directed into the rectangular grid cell.

Example 11 includes the subject matter of Example 9, wherein the process further comprises comparing the local density minimum or the local density maximum to a predefined allowable range of density values, and reporting a density violation if the local density minimum or the local density maximum is outside of the predefined allowable range.

Example 12 includes the subject matter of Example 11, wherein reporting the density violation includes reporting a location of the density violation on the integrated circuit layout.

Example 13 includes the subject matter of any of Examples 1-12, wherein determining the density of the integrated circuit layout comprises subdividing the integrated circuit layout into a plurality of rectangular subdomains; constructing a circumambient around each of the plurality of rectangular subdomains; defining a grid of sample points across one or more of the plurality of rectangular subdomains; and determining a local density value and a density gradient value for sample points in the grid of sample points.

Example 14 includes the subject matter of Example 13, wherein constructing the circumambient comprises defining a frame around a subdomain of the plurality of rectangular subdomains, the frame defining the circumambient between the frame and a boundary of the subdomain; and mirroring a portion of the subdomain into the circumambient.

Example 15 includes the subject matter of Example 14, wherein constructing the circumambient further comprises using a portion of an adjacent subdomain in the circumambient at locations where the portion of the adjacent subdomain intersects the frame.

Example 16 is a computer program product including one or more non-transitory machine-readable mediums encoded with instructions that when executed by one or more processors cause a process to be carried out for determining a density of an integrated circuit layout, the process comprising: reading a database file containing data representing an integrated circuit layout with polygons; subdividing the integrated circuit layout into rectangular subdomains; defining an array of sample points on the selected subdomain; and determining a local density of polygons within a sample window located at each sample point in the array of sample points, wherein the local density is a convolution of a polygon area function and a kernel function.

Example 17 includes the subject matter of Example 16, wherein the kernel function is a center-weighted kernel function.

Example 18 includes the subject matter of Examples 16 or 17, wherein the kernel function is a bandwidth-limiting kernel function.

Example 19 includes the subject matter of any of Examples 16-18, wherein the process further comprises interpolating a layout density of a rectangular cell defined between adjacent sample points in the array of sample points.

Example 20 includes the subject matter of any of Examples 16-18, wherein the process further comprises determining a density gradient at each sample point in the array of sample points.

Example 21 includes the subject matter of Example 20, wherein the process further comprises interpolating a local density of a rectangular cell defined between adjacent sample points in the array of sample points.

Example 22 includes the subject matter of any of Examples 19-21, wherein the interpolation is based on density gradients at each of the adjacent sample points defining the rectangular cell.

Example 23 includes the subject matter of Example 22, wherein the process further comprises determining a local density maximum or a local density minimum within the rectangular cell.

Example 24 includes the subject matter of Example 23, wherein determining the local density maximum includes determining whether density gradients at the adjacent sample points defining the rectangular cell are directed into the rectangular cell and wherein determining the local density minimum includes determining whether density gradients at the adjacent sample points defining the rectangular cell are directed out of the rectangular cell.

Example 25 includes the subject matter of any of Examples 16-23, wherein the process further comprises comparing the local density maximum and/or the local density minimum to a predefined range of density values; and reporting a density violation if the local density maximum or the local density minimum is outside the predefined range of density values.

Example 26 includes the subject matter of Example 25, wherein reporting the density violation includes reporting a location of the density violation on the integrated circuit layout.

Example 27 includes the subject matter of Example 26, wherein the location identifies one or more specific rectangular cell.

Example 28 includes the subject matter of any of Examples 16-27, and further comprises constructing a circumambient around a selected subdomain of the rectangular subdomains, wherein constructing the circumambient comprises defining a rectangular frame around the selected subdomain, the rectangular frame defining the circumambient between the rectangular frame and a boundary of the selected subdomain; and mirroring a portion of the selected subdomain into the circumambient.

Example 29 includes the subject matter of Example 28, wherein the circumambient includes a portion of an adjacent subdomain at one or more locations where the adjacent subdomain intersects the rectangular frame.

Example 30 includes the subject matter of any of Examples 16-29 and further comprises outputting a map of density values.

Example 31 includes the subject matter of Example 30, wherein the map includes indicia for one or more value selected from (i) a density, (ii) a density gradient, (iii) a density maximum, (iv) a density minimum, or (v) a density violation.

Example 32 is a computer program product including one or more non-transitory machine-readable mediums encoded with instructions, that when executed by one or more processors, cause a process to be carried out for determining an integrated circuit layout density, the process comprising: defining a grid of sample points across an integrated circuit layout represented by rectilinear polygons; determining, for each sample point in the grid of sample points, an area of the rectilinear polygons within a sample window; determining, for each sample point in the grid of sample points, a local density of the rectilinear polygons within the sample window, wherein the area of rectilinear polygons within the window is weighted according to a center-weighted kernel; and determining a density of the integrated circuit layout based on the local density of the rectilinear polygons at a plurality of sample points in the grid of sample points.

Example 33 includes the subject matter of Example 32 further comprising: recording the local density to a file; and searching the file for any value of the local density that is outside a predefined range of density values.

Example 34 includes the subject matter of Example 33 further comprising: correcting the local density of the layout for any window position where the value of the local density is outside the predefined range of density values.

Example 35 includes the subject matter of Example 33 further comprising: moving the sample window stepwise to each sample point using a step size that is less than half a size of the window.

Example 36 includes the subject matter of any of Examples 32-35 further comprising outputting a map of the integrated circuit layout, the map including indicia of one or more of (i) a density maximum, (ii) a density minimum, (iii) a density violation, (iv) a density contour line, or (v) a density gradient.

Example 37 includes the subject matter of Example 36, wherein the map is color coded according to density value.

Example 38 includes the subject matter of any of Examples 32-37 further comprising reporting one or more of (i) a location of a density violation, (ii) a value of a density maximum, (iii) a location of the density maximum, (iv) a value of a density minimum, or (v) a location of the density minimum.

Methods for computing layout density in accordance with some embodiments of the present disclosure advantageously provide increased confidence in layout density at the hard-IP level, improve the accuracy of density metrics, and elminate additional gridding constraints due to methods currently in use. Additional benefits include being able to choose the window size without being constrained by pitch. Methods according to the present disclosure also enable extracting the true maximum and minimum density values across a die or other layout, providing a smooth and robust density gradient computation, and including density into earlier CAD flows instead of at a post-processing operation.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon.

What is claimed is:

1. A computer program product including one or more non-transitory machine-readable mediums encoded with instructions that, when executed by one or more processors, cause a process to be carried out for determining a density of an integrated circuit layout, the process comprising:

reading a database file containing data representing an integrated circuit layout with polygons;

defining a sample window located at a sample point on the integrated circuit layout;

determining a local density of polygons within the sample window, the local density being a convolution of a center-weighted kernel function and a layout function for determining an area of the polygons within the sample window; and determining a density of the integrated circuit layout based on the local density of polygons;

wherein the center-weighted kernel function is a center-weighted bandwidth-limiting kernel.

2. The computer program product of claim 1, wherein the determining the density of the integrated circuit layout comprises:

defining a grid of sample points on the integrated circuit layout;

moving the sample point stepwise to the sample points on the integrated circuit layout; and determining a local density for each sample point in the grid of the sample points.

3. The computer program product of claim 2, wherein the process further comprises:

interpolating a local density of a rectangular grid cell defined between adjacent sample points in the grid of the sample points.

4. The computer program product of claim 3, wherein the interpolating the local density is based on density gradients at each sample point of the adjacent sample points defining the rectangular grid cell.

5. The computer program product of claim 4, wherein the process further comprises:

determining a local density minimum or a local density maximum within the rectangular grid cell.

6. The computer program product of claim 5, wherein the determining the local density minimum or the local density maximum includes determining whether density gradients at the adjacent sample points defining the rectangular grid cell are directed into the rectangular grid cell.

7. The computer program product of claim 5, wherein the process further comprises:

comparing the local density minimum or the local density maximum to a predefined allowable range of density values; and reporting a density violation if the local density minimum or the local density maximum is outside of the predefined allowable range.

8. The computer program product of claim 7, wherein the reporting the density violation includes reporting a location of the density violation on the integrated circuit layout.

9. The computer program product of claim 8, wherein the location of the density violation is within the rectangular grid cell.

10. The computer program product of claim 1, wherein the determining the density of the integrated circuit layout comprises:

subdividing the integrated circuit layout into a plurality of rectangular subdomains;

defining a grid of sample points across one or more of the plurality of rectangular subdomains; and determining a local density value and a density gradient value for sample points in the grid of the sample points across the one or more of the plurality of rectangular subdomains.

11. A computer program product including one or more non-transitory machine-readable mediums encoded with instructions that, when executed by one or more processor, cause a process to be carried out for determining a density of an integrated circuit layout, the process comprising:

reading a database file containing data representing an integrated circuit layout with polygons;

subdividing the integrated circuit layout into a plurality of rectangular subdomains;

defining an array of sample points on a selected rectangular subdomain of the plurality of rectangular subdomains; and determining a local density of polygons within a sample window located at each sample point in the array of sample points, wherein the local density is a convolution of a polygon area function and a center-weighted kernel function.

12. The computer program product of claim 11, wherein the center-weighted kernel function is a bandwidth-limiting kernel.

13. The computer program product of claim 12, wherein the process further comprises:

interpolating a layout density of a rectangular cell defined between adjacent sample points in the array of sample points.

14. The computer program product of claim 12, wherein the process further comprises:

determining a density gradient at each sample point in the array of sample points; and interpolating a local density of a rectangular cell defined between adjacent sample points in the array of sample points.

15. The computer program product of claim 14, wherein the process further comprises:

determining a local density maximum or a local density minimum within the rectangular cell.

16. The computer program product of claim 15, wherein the process further comprises:

determining a location of the local density maximum or the local density minimum within the rectangular cell.

17. The computer program product of claim 15, wherein the process further comprises:

comparing the local density maximum and/or the local density minimum to a predefined range of density values; and reporting a density violation if the local density maximum or the local density minimum is outside the predefined range of density values.

18. The computer program product of claim 11 further comprising:

outputting a map of density values, the map including indicia for one or more value selected from (i) a density, (ii) a density gradient, (iii) a density maximum, (iv) a density minimum, or (v) a density violation.

19. A computer program product including one or more non-transitory machine-readable mediums encoded with instructions that, when executed by one or more processors, cause a process to be carried out for determining an integrated circuit layout density, the process comprising:

defining a grid of sample points across an integrated circuit layout represented by rectilinear polygons;

determining, for each sample point in the grid of sample points, an area of the rectilinear polygons within a sample window;

determining, for each sample point in the grid of sample points, a local density of the rectilinear polygons within the sample window, wherein the area of the rectilinear polygons within the sample window is weighted according to a center-weighted kernel; and determining a density of the integrated circuit layout based on the local density of the rectilinear polygons at a plurality of sample points in the grid of sample points.

20. The computer program product of claim 19 further comprising:

recording the local density to a file;

searching the file for any value of the local density that is outside a predefined range of density values; and correcting the local density of the integrated circuit layout for any window position where the value of the local density is outside the predefined range of density values.

* * * * *